(12) United States Patent
Chatel et al.

(10) Patent No.: US 10,980,244 B2
(45) Date of Patent: *Apr. 20, 2021

(54) WHOLE GRAIN COMPOSITION COMPRISING HYDROLYZED STARCH

(71) Applicant: The Quaker Oats Company, Chicago, IL (US)

(72) Inventors: Robert E. Chatel, Hoffman Estates, IL (US); Yongsoo Chung, Palatine, IL (US); Justin A. French, Frisco, TX (US)

(73) Assignee: The Quaker Oats Company, Chicago, IL (US)

( * ) Notice: Subject to any disclaimer, the term of this patent is extended or adjusted under 35 U.S.C. 154(b) by 471 days.

This patent is subject to a terminal disclaimer.

(21) Appl. No.: 14/959,941

(22) Filed: Dec. 4, 2015

(65) Prior Publication Data

US 2016/0081375 A1    Mar. 24, 2016

Related U.S. Application Data

(63) Continuation-in-part of application No. 14/209,075, filed on Mar. 13, 2014, now Pat. No. 9,622,500, which is a continuation-in-part of application No. 14/059,566, filed on Oct. 22, 2013, now Pat. No. 9,149,060, application No. 14/959,941, which is a continuation-in-part of application No. 14/209,000, filed on Mar. 13, 2014, now Pat. No. 9,510,614, which is a continuation-in-part of application No.

(Continued)

(51) Int. Cl.
| | | |
|---|---|---|
| A21D 13/04 | (2017.01) | |
| A21D 13/047 | (2017.01) | |
| A21D 13/40 | (2017.01) | |
| A23L 2/52 | (2006.01) | |
| A23G 9/42 | (2006.01) | |
| A23C 9/13 | (2006.01) | |
| A23C 19/09 | (2006.01) | |
| A23C 9/154 | (2006.01) | |
| A23G 1/56 | (2006.01) | |
| A23L 2/02 | (2006.01) | |
| A21D 6/00 | (2006.01) | |
| A23L 2/38 | (2021.01) | |
| A21D 8/04 | (2006.01) | |
| A21D 10/00 | (2006.01) | |
| A23P 30/20 | (2016.01) | |
| A23L 7/10 | (2016.01) | |
| A23L 7/104 | (2016.01) | |
| A23P 10/10 | (2016.01) | |
| A23L 23/00 | (2016.01) | |
| A23C 19/08 | (2006.01) | |

(52) U.S. Cl.
CPC ............ *A21D 13/047* (2017.01); *A21D 6/00* (2013.01); *A21D 6/003* (2013.01); *A21D 8/042* (2013.01); *A21D 10/005* (2013.01); *A21D 13/40* (2017.01); *A23C 9/1315* (2013.01); *A23C 9/1544* (2013.01); *A23C 19/08* (2013.01); *A23C 19/09* (2013.01); *A23G 1/56* (2013.01); *A23G 9/42* (2013.01); *A23L 2/02* (2013.01); *A23L 2/38* (2013.01); *A23L 2/52* (2013.01); *A23L 7/107* (2016.08); *A23L 7/197* (2016.08); *A23L 7/198* (2016.08); *A23L 23/00* (2016.08); *A23P 10/10* (2016.08); *A23P 30/20* (2016.08); *A23V 2002/00* (2013.01)

(58) Field of Classification Search
CPC ............................ A21D 13/047; A23L 29/35
USPC ......................................................... 426/28
See application file for complete search history.

(56) References Cited

U.S. PATENT DOCUMENTS

| | | |
|---|---|---|
| 1,163,175 A | 12/1915 | Rullman |
| 1,384,894 A | 7/1921 | Horlick |

(Continued)

FOREIGN PATENT DOCUMENTS

| | | |
|---|---|---|
| AU | 1989045913 | 12/1989 |
| CA | 1045890 | 1/1979 |

(Continued)

OTHER PUBLICATIONS

Grenus, Food Product Design, Applications, Agglomerations, Jul. 10, 2014, Weeks Publishing Co., pp. 1-4, www.foodproductdesign.com/articles/2004/07/food-product-design-applications.
PCT Application No. PCT/US2008/060323 International Search Report and Written Opinion dated Aug. 13, 2008.
PCT Application No. PCT/US2009/059916 International Search Report and Written Opinion dated Feb. 16, 2010.
PCT Application No. PCT/US2014/21913 International Search Report and Written Opinion dated Jun. 23, 2014.

(Continued)

*Primary Examiner* — Hamid R Badr
(74) *Attorney, Agent, or Firm* — Barnes & Thornburg LLP; G. Peter Nichols

(57) ABSTRACT

A composition comprising a whole grain with hydrolyzed starch. Although the starch can shift from relatively higher molecular weight moieties to relatively lower molecular weight moieties during hydrolysis, the relative proportions of the principal anatomical components of the caryopses of the grain—the starchy endosperm, germ and bran—remain approximately the same as evinced, for example, by the weight percentages and relative mass ratios of starch, fat, protein, dietary fiber, beta-glucan, and sugar in the composition. Additionally, the whole grain composition can be a powder, for example, a flour, and the whole grain composition can be granulated to a desired size to provide a powder that is highly dispersible in liquid. When gelatinized, hydrated and dispersed in a liquid, the whole grain with hydrolyzed starch can have a lower viscosity, grittiness, and graininess compared to the same variety of whole grain with unhydrolyzed starch.

24 Claims, 8 Drawing Sheets

Related U.S. Application Data

14/059,566, filed on Oct. 22, 2013, now Pat. No. 9,149,060, which is a continuation of application No. 12/666,509, filed as application No. PCT/US2009/060016 on Oct. 8, 2009, now Pat. No. 8,591,970, which is a continuation-in-part of application No. 12/264,399, filed on Nov. 4, 2008, now Pat. No. 8,574,644.

(60) Provisional application No. 61/783,046, filed on Mar. 14, 2013.

(56) References Cited

U.S. PATENT DOCUMENTS

| | | | |
|---|---|---|---|
| 3,116,150 A | 12/1963 | Baker | |
| 3,391,003 A | 7/1968 | Armstrong | |
| 3,494,769 A | 2/1970 | Tressler | |
| 3,579,352 A | 5/1971 | Bookwalter | |
| 3,595,671 A | 7/1971 | Cooke | |
| 3,732,109 A | 5/1973 | Poat | |
| 3,950,543 A | 4/1976 | Buffa | |
| 4,028,468 A | 6/1977 | Hohner | |
| 4,167,584 A | 9/1979 | Nelson | |
| 4,247,561 A | 1/1981 | Nelson | |
| 4,259,358 A | 3/1981 | Duthie | |
| 4,438,150 A | 3/1984 | Gantwerker | |
| 4,439,460 A | 3/1984 | Tsau | |
| 4,500,558 A | 2/1985 | Fulger | |
| 4,551,347 A | 11/1985 | Karwowski | |
| 4,613,507 A | 9/1986 | Fulger | |
| 4,668,519 A | 5/1987 | Dartey | |
| 4,692,340 A | 9/1987 | Grutte | |
| 4,834,988 A * | 5/1989 | Karwowski | C12Y 302/01001 426/20 |
| 4,886,665 A | 12/1989 | Kovacs | |
| 4,957,563 A | 9/1990 | Gallaher | |
| 4,999,298 A | 3/1991 | Wolfe | |
| 5,045,328 A * | 9/1991 | Lewis | C12Y 302/01001 426/28 |
| 5,106,343 A | 4/1992 | Laufer | |
| 5,106,634 A | 4/1992 | Thacker | |
| 5,145,698 A | 9/1992 | Cajigas | |
| 5,234,704 A | 8/1993 | Devine | |
| 5,320,856 A | 6/1994 | Veronesi | |
| 5,334,407 A | 8/1994 | Donnelly | |
| 5,385,746 A | 1/1995 | De Almeida | |
| 5,395,623 A | 3/1995 | Kovach | |
| 5,407,694 A | 4/1995 | Devine | |
| 5,458,893 A | 10/1995 | Smith | |
| 5,476,675 A | 12/1995 | Lou | |
| 5,490,997 A | 2/1996 | Devine | |
| 5,523,109 A | 6/1996 | Hellweg | |
| 5,554,402 A | 9/1996 | Smith | |
| 5,571,334 A | 11/1996 | Dunn | |
| 5,686,123 A | 11/1997 | Lindahl | |
| 5,744,187 A | 4/1998 | Gaynor | |
| 5,849,090 A | 12/1998 | Haralampu | |
| 5,863,590 A | 1/1999 | Alan | |
| 5,912,031 A | 6/1999 | Fitchett | |
| 5,932,264 A | 8/1999 | Hurd | |
| 5,981,237 A | 11/1999 | Meagher | |
| 5,985,339 A | 11/1999 | Kamarei | |
| 5,997,917 A | 12/1999 | Uchida | |
| 6,135,015 A | 10/2000 | Mendez | |
| 6,168,821 B1 | 1/2001 | Castleberry | |
| 6,190,708 B1 | 2/2001 | Triantafyllou | |
| 6,210,738 B1 | 4/2001 | Chen | |
| 6,210,741 B1 | 4/2001 | van Lengerich | |
| 6,221,406 B1 | 4/2001 | Meschonat | |
| 6,224,106 B1 | 4/2001 | Meschonat | |
| 6,287,626 B1 | 9/2001 | Fox | |
| 6,395,314 B1 | 5/2002 | Whalen | |
| 6,451,369 B1 | 9/2002 | Triantafyllou | |
| 6,482,459 B1 | 11/2002 | Anderson | |
| 6,592,914 B1 | 7/2003 | Triantafyllou | |
| 6,610,349 B1 | 8/2003 | Delrue | |
| 6,617,446 B1 | 9/2003 | Papadopoulos | |
| 6,685,974 B2 | 2/2004 | Whalen | |
| 6,797,307 B2 | 9/2004 | Malkki | |
| 7,030,092 B1 | 4/2006 | Levine | |
| 7,160,564 B2 | 1/2007 | Oste | |
| 7,244,457 B2 | 7/2007 | Racicot | |
| 7,754,270 B2 * | 7/2010 | Wuersch | A23G 1/56 426/590 |
| 7,794,774 B2 | 9/2010 | Foster | |
| 7,914,972 B2 | 3/2011 | Fujiwara | |
| 8,241,696 B2 | 8/2012 | Chung | |
| 8,518,469 B2 | 8/2013 | Macdonald | |
| 8,574,644 B2 | 11/2013 | Chatel | |
| 8,591,970 B2 | 11/2013 | Chatel | |
| 8,742,095 B2 | 6/2014 | Lehtomaki | |
| 9,011,947 B2 * | 4/2015 | Carder | 426/28 |
| 9,149,060 B2 | 10/2015 | Chatel | |
| 9,150,895 B2 | 10/2015 | Kurihara | |
| 2001/0002269 A1 | 5/2001 | Zhao | |
| 2001/0022986 A1 | 9/2001 | Girsh | |
| 2002/0127319 A1 | 9/2002 | Gare | |
| 2004/0101935 A1 | 5/2004 | Vasanthan | |
| 2005/0089602 A1 | 4/2005 | Kvist | |
| 2005/0106216 A1 | 5/2005 | Maurer | |
| 2005/0191400 A1 | 9/2005 | Satyavolu | |
| 2005/0214347 A1 | 9/2005 | Astrup | |
| 2005/0244563 A1 | 11/2005 | Cavalieri | |
| 2005/0260305 A1 | 11/2005 | Adele | |
| 2006/0008574 A1 | 1/2006 | Begli | |
| 2006/0093720 A1 | 5/2006 | Tatz | |
| 2006/0115573 A1 | 6/2006 | Singer | |
| 2006/0121174 A1 | 6/2006 | Franke | |
| 2006/0134299 A1 | 6/2006 | Lahteenmaki | |
| 2006/0141097 A1 | 6/2006 | Guo | |
| 2006/0240148 A1 | 10/2006 | Nguyen | |
| 2006/0257548 A1 | 11/2006 | Crofsky | |
| 2007/0026105 A1 | 2/2007 | Seo | |
| 2007/0104854 A1 | 5/2007 | Foster | |
| 2007/0141218 A1 | 6/2007 | Chatel | |
| 2007/0154609 A1 | 7/2007 | Li | |
| 2007/0172568 A1 | 7/2007 | Spelman | |
| 2007/0184175 A1 * | 8/2007 | Rubio | A23L 7/198 426/622 |
| 2007/0264400 A1 | 11/2007 | Milne | |
| 2008/0131582 A1 * | 6/2008 | Karwowski | A23L 7/197 426/622 |
| 2008/0305212 A1 | 12/2008 | Wong | |
| 2010/0015306 A1 | 1/2010 | Pereyra | |
| 2010/0104718 A1 | 4/2010 | Durand | |
| 2010/0112167 A1 | 5/2010 | Chatel | |
| 2012/0245111 A1 | 9/2012 | Hoebler | |
| 2013/0170362 A1 | 9/2013 | Manning | |
| 2013/0323799 A1 | 12/2013 | Takaha | |
| 2014/0017356 A1 | 1/2014 | Te Biesebeke | |
| 2014/0050819 A1 | 2/2014 | Chatel | |
| 2014/0193563 A1 | 7/2014 | Carder | |
| 2014/0193564 A1 | 7/2014 | Carder | |
| 2015/0183821 A1 | 7/2015 | Konstantinov | |
| 2015/0191758 A1 | 7/2015 | Larsen | |
| 2015/0351432 A1 | 12/2015 | Triantafyllou | |
| 2016/0185641 A1 | 6/2016 | Zuback | |

FOREIGN PATENT DOCUMENTS

| | | |
|---|---|---|
| CA | 2015149 | 10/1990 |
| CN | 1386446 | 12/2002 |
| DE | 970141 | 8/1958 |
| EP | 0078782 B1 | 5/1983 |
| EP | 0231729 | 8/1987 |
| EP | 0512249 A1 | 11/1992 |
| EP | 0474230 B1 | 3/1995 |
| FR | 2620906 | 3/1989 |
| JP | 63116657 S | 5/1988 |
| JP | 2000004852 | 1/2000 |
| JP | 2002171920 | 6/2002 |
| RU | 2237419 | 10/2001 |
| WO | 1993000826 | 1/1993 |

(56) References Cited

FOREIGN PATENT DOCUMENTS

| WO | 9604799 | 2/1996 |
| --- | --- | --- |
| WO | 2000030457 | 6/2000 |
| WO | 2003090557 | 11/2003 |
| WO | 2007020059 | 2/2007 |
| WO | 2008028994 | 3/2008 |
| WO | 2008096044 | 8/2008 |
| WO | 2009077659 | 6/2009 |
| WO | 2009127687 | 10/2009 |
| WO | 2009158588 A1 | 12/2009 |
| WO | 2010108277 A1 | 9/2010 |
| WO | 2014160351 A1 | 10/2014 |

OTHER PUBLICATIONS

Anderson, et al. "Gelatinazation of corn grits by roll cooking, extrusion cooking and steaming," Starche 22:130-135.

Brenda, The comprehensive Enzyme Information System, BC 3.2.1.1.—alpha amylase; pp. 1 to 297; Retrieved from the internet: http://www.brenda-enzymes.info/php/result_flat.php4?ecno=3.2.1.1 &organism_list=,date unknown.

The Whole Grains Council, "What are the Health Benefits?," http://wholegrainscouncil.org/whole-grains-101/what-are-the-health-benefits, 2 pages.

Davis, "The Effect of Cold on Micro-Organisms in Relation to Dairying," Express Dairy Co (London), Proceedigns of the Society for Applied Bacteriology, vol. 14, Issue 2, pp. 216-242, Oct. 1951.

Food Reference, About.com "Why Does Milk Curdle," http://foodreference.about.com/od/Dairy/a/Why-Does-Milk-Curdle.htm, pp. 1-2.

PCT Application No. PCT/US2012/046450 International Search Report and Written Opinion dated Sep. 6, 2012.

Springer New York, "Milk and Milk Products," Essentials of Food Science, Food Science Texts Series, pp. 237-269.

Camire, Mary Ellen, et al. "Thermal Processing Effects on Dietary Fiber Composition and Hydration Capacity in Corn Meal, Oat Meal, and Potato Peels," Cereal Chemistry 68(6), pp. 645-647, vol. 68, No. 6, 1991 (3 pages).

Hoseney, R. Carl, "Principles of Cereal Science and Technology," 1986, American Association of Cereal Chemists, Inc., St. Paul Minnesota 55121, pp. 148-149 (4 pages).

Singh, Narpinder, et al., "A Comparison of Wheat Starch, Whole Wheat Meal and Oat Flour in the Extrusion Cooking Process," J. Food Engineering 34 (1997) 15-32 (18 pages).

Tapola, N., et al. "Glycemic responses of oat brain products in type 2 diabetic patients," Nutrition, Metabolism & Cardiovascular Diseases (2005) 15, 255-261 (7 pages).

Vasanthan, et al. "Dietary fiber profile of barley flour as affected by extrusion cooking," Food Chemistry 77 (2002) pp. 35-40 (6 pages).

Likimani, T.A., "Extrusion Cooking of Corn/Soybean Mix in Presence of Thermostable a-Amylase", Jounal of Food Science, vol. 56, No. 1, 1991, pp. 99-105 (7 pages).

* cited by examiner

WHOLE GRAIN COMPOSITION COMPRISING HYDROLYZED STARCH

CROSS-REFERENCE TO RELATED APPLICATIONS

This application is a continuation-in-part of U.S. Nonprovisional patent application Ser. No. 14/209,000, which is a continuation-in-part of U.S. Nonprovisional patent application Ser. No. 14/059,566, filed on Oct. 22, 2013, which is a continuation of U.S. Nonprovisional patent application Ser. No. 12/666,509, filed on Apr. 25, 2011, now U.S. Pat. No. 8,591,970, which was a national stage filing of PCT Application No. PCT/US2009/060016, filed on Oct. 8, 2009, which is a continuation-in-part of U.S. Nonprovisional patent application Ser. No. 12/264,399, filed on Nov. 4, 2008, now U.S. Pat. No. 8,574,644; additionally, this application is a continuation-in-part of U.S. Nonprovisional patent application Ser. No. 14/209,075, which is a continuation-in-part of U.S. Nonprovisional patent application Ser. No. 14/059,566, filed on Oct. 22, 2013, which is a continuation of U.S. Nonprovisional patent application Ser. No. 12/666,509, filed on Apr. 25, 2011, now U.S. Pat. No. 8,591,970, which was a national stage filing of PCT Application No. PCT/US2009/060016, filed on Oct. 8, 2009, which is a continuation-in-part of U.S. Nonprovisional patent application Ser. No. 12/264,399, filed on Nov. 4, 2008, now U.S. Pat. No. 8,574,644; additionally, U.S. Nonprovisional patent application Ser. No. 14/209,000 is a nonprovisional application of, and claims priority to, U.S. Provisional Patent Application No. 61/783,046 filed on Mar. 14, 2013; additionally, U.S. Nonprovisional patent application Ser. No. 14/209,075 is a nonprovisional application of, and claims priority to, U.S. Provisional Patent Application No. 61/783,046 filed on Mar. 14, 2013; additionally, this application claims priority to all of the above-referenced patent applications and incorporates U.S. Nonprovisional patent application Ser. No. 12/264,399, filed on Nov. 4, 2008, now U.S. Pat. No. 8,574,644, by reference in its entirety as an example.

FIELD OF THE INVENTION

The present invention relates generally, for example, to food grade compositions comprising a hydrolyzed starch. As a further illustration, the invention relates to a composition comprising at least a portion of a grain with hydrolyzed starch. For example, the present invention relates to grain flour, oat flour, barley flour, or bran flour (e.g., oat bran flour). The invention also relates to soluble grains and/or at least a portion thereof. For example, the invention relates to food products prepared with whole grain having soluble components (hereinafter "soluble grain flour"). As another example, the present invention relates to food products prepared with whole oat flour having soluble components (hereinafter "soluble oat flour") or whole barley flour having soluble components (hereinafter "soluble barley flour"). As another illustration, the present invention relates to methods of making compositions comprising at least a portion of a grain with hydrolyzed starch. For example, the present invention relates to methods of making soluble oat or barley flour.

BACKGROUND OF THE INVENTION

Products comprising at least a portion of a grain can be desirable for nutritive and/or fiber content. However, these products can also have undesirable mouthfeel characteristics for some consumers. For example, such products can be too viscous, gritty, or result in a thick coating on the mouth upon consumption. Furthermore, products comprising grain that have better mouthfeel can be modified in a way that lacks certain nutritive or fiber-related components or benefits that would otherwise be present.

BRIEF SUMMARY OF THE INVENTION

In one aspect, the invention provides a composition comprising a whole grain, and the whole grain comprises hydrolyzed starch.

These and other aspects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations. Every component of each embodiment of the invention is not shown where illustration is not necessary to allow those of ordinary skill in the art to understand the invention.

DETAILED DESCRIPTION OF THE INVENTION

Figure 1:
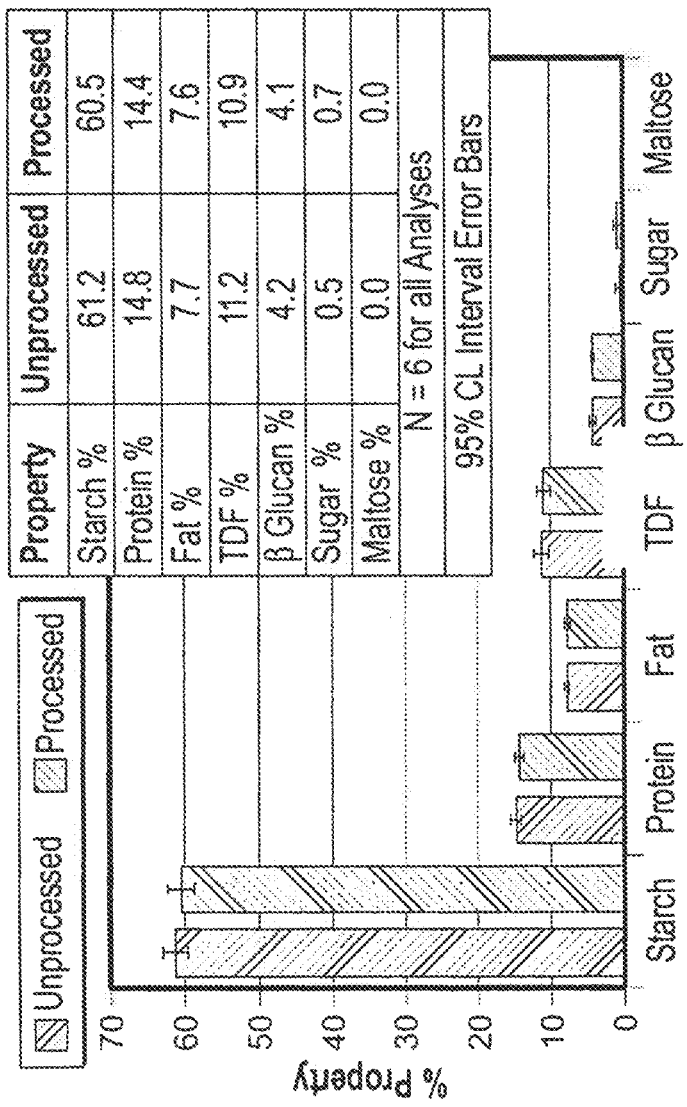
FIG. 1 depicts a proximate composition of unprocessed and processed whole oat flour.

Oatmeal has for many years been a staple of the human diet due to its health benefits. For example, numerous studies have shown that eating oatmeal on a daily basis can help lower blood cholesterol, reduce risk of heart disease, promote healthy blood flows as well as maintain healthy blood pressure levels. Additionally, oatmeal has a high content of complex carbohydrates and fibers, which facilitates slow digestion and stable blood-glucose levels.

With today's hectic lifestyle, consumers are demanding convenience, such as portability and ease of preparation. Consumers desire oatmeal from a variety of food sources including beverages and convenience foods such as bars, cookies, crackers, smoothies, shakes (e.g., breakfast shakes), and the like.

For example, it can be desirable to prepare a whole grain product (e.g., oat, barley, etc.) that has sufficient soluble fiber to meet the FDA threshold necessary to justify a health claim. For example, a whole grain product (e.g., whole oat product) must have 0.75 g soluble beta-glucan fiber per serving of food to support a health claim. To prepare an oat beverage that contains at least 0.75 g soluble oat fiber per serving (about 18 g of whole grain oats), it can be beneficial to use highly dispersible oat flour that also retains its whole grain standard (e.g., highly soluble whole grain oat flour). "Studies show that eating whole grains instead of refined grains lowers the risk of many chronic diseases. While benefits are most pronounced for those consuming at least 3 servings daily, some studies show reduced risks from as little as one serving daily." http://wholegrainscouncil.org/whole-grains-101/what-are-the-health-benefits. Note that 1 full serving of whole grain is 16 g.

The inventors have determined that it would be useful to produce different types of food products that are made with certain components and/or characteristics, for example, healthier components or components have suitable and/or desirable characteristics for consumers or manufacturers. As an example, it can be desirable to produce whole grain (e.g., whole oat or barley) flour that is highly dispersible in liquid, semisolid, or solid media, and maintains its standard of identity as whole grain.

In some embodiments, aspects of the invention relate to food products containing highly dispersible, soluble whole oat flour. The soluble whole oat flour maintains its standard of identity as whole grain and thus has the characteristics of whole grain oats.

In some embodiments, aspects of the present invention relate to the use of the soluble oat flour in various food products including liquid food products such as beverages, semi-solid food products such as yogurt, and solid food products such as bakery items in order to provide enhanced health benefits.

In some embodiments, the present invention relates to products comprising grains with hydrolyzed starch. For example, in some embodiments, the invention provides a soluble whole grain flour. As an illustration, the soluble whole grain flour can be prepared using an extruder or other suitable continuous cooker. In some embodiments, the process is easier, less expensive, and less time-consuming than prior art processes. An example of a process for preparing a grain flour comprising hydrolyzed starch (e.g., soluble oat or barley flour) is found in U.S. patent application Ser. No. 12/264,399 filed Nov. 4, 2008 and issued as U.S. Pat. No. 8,574,644 on Nov. 5, 2013, the contents of which is expressly incorporated herein by reference in its entirety as an example. In one embodiment, a method of producing soluble oat or barley flour comprises using a pre-conditioner and an extruder or other suitable continuous cooker.

In some embodiments, the soluble whole oat flour (or other whole grain) made in accordance with the methods described herein maintains its standard of identity as whole grain throughout processing (e.g., starch hydrolysis, pelletizing, drying, and/or grinding). "Whole grain" or "standard of identity as whole grain" shall mean that the cereal grain, for example, oat, "consists of the intact, ground cracked or flaked caryopsis, whose principal anatomical components—the starchy endosperm, germ and bran—are present in approximately the same relative proportions as they exist in the intact caryopsis." Further, if the principal nutrients (i.e., starch, fat, protein, dietary fiber, beta-glucan, and sugar) are present in approximately the same relative proportions in a partially hydrolyzed grain and the original grain, it can be assumed that the processed grain (e.g., the partially hydrolyzed grain) maintains its whole grain status. However, since the average molecular weight of starch (e.g., amylopectin) in whole grains varies widely across the various types of whole grains (1-6 M Dalton) and even among whole grain oat products, a shift in starch moieties from higher molecular weight to lower molecular weight does not alter whole grain status if the total starch content remains the same.

As shown, for example, in FIG. 1, the processed oat flour made in accordance with the instant disclosure maintains substantially the same levels of starch, protein, fat, total dietary fiber (TDF), glucan, sugar and maltose as the unprocessed oat flour when considered in terms of relative mass ratios of the components to starch. For example, in one embodiment illustrated in FIG. 1, the processed oat flour made in accordance with the instant disclosure experiences a change in the mass ratio of protein to starch of about −0.0038, a change in the ratio of fat to starch of about −0.0002, a change in the ratio of TDF to starch of about −0.0028, a change in the ratio of beta-glucan to starch of about −0.009, a change in the ratio of sugar to starch of about 0.0034, and no measurable change in the ratio of maltose to starch. Furthermore, in one embodiment the processed oat flour made in accordance with the instant disclosure experiences a relative change in the mass ratio of protein to starch of about −0.016, a relative change in the ratio of fat to starch of about −0.002, a relative change in the ratio of TDF to starch of about −0.016, a relative change in the ratio of beta-glucan to starch of about −0.013, a relative change in the ratio of sugar to starch of about 0.416, and no measurable relative change in the ratio of maltose to starch. As can be seen, the absolute change in the ratio is the better indicator of whether whole grain status is maintained because components that are initially present in small amounts can have significant relative increases (e.g., sugar or specific sugars such as maltose). However, when considered as a ratio of the component to other components at higher mass concentrations, the change is negligible.

Put another way, in some embodiments starch is originally present, for example, at around 50 wt % or more of a composition while sugar is only present at around 1 wt % or less. Accordingly, if a small percentage of the original mass of starch is converted to sugar, or if there is a small measurement error, then there can be what appears to be a significant change in the amount of sugar as measured relative to the original amount of sugar, but for practical purposes the absolute change in sugar is negligible. This is so because the total content of the principal nutrients can naturally vary among crops for an unprocessed grain. As a result, a certain degree of tolerance, as illustrated above, can be allowed in determining that the principal nutrients are present in the same relative proportions for a partially hydrolyzed grain and the original grain. In some embodiments, the degree of tolerance is equivalent to the naturally occurring variance in the ratios of the principal nutrients to starch in a variety of grain. Furthermore, a shift from high molecular weight starch (e.g., amylopectin) to low molecular weight starch (e.g., amylopectin) does not change the total starch content and does not impact whole grain status.

The term "soluble flour" (e.g., "soluble grain flour," soluble whole grain flour," "soluble bran flour," "soluble oat flour," or "soluble whole grain oat flour") refers to flour that maintains soluble components such as beta-glucan but also is highly dispersible in liquids such as water. The dispersibility of the flour was measured in water observing formation of a lump and size of the lumps on the top and bottom of the water after stirring for five (5) seconds. "Highly dispersible" therefore means that there are no lumps present or formed after stirring the mixture for about 5 seconds. As the skilled artisan would recognize, stirring can also be interchanged with shaking or some other specific movement to incorporate and mix the flour into the liquid.

The term "regular oat flour," "typical oat flour," and "unprocessed oat flour" refers to whole oat flour that is made by conventional or traditional milling methods and not "soluble oat flour" or oat flour made in accordance with the methods described herein, unless otherwise clear from context. For example, a whole oat flour with hydrolyzed starch (e.g., soluble oat flour made using the methods described herein) can still qualify as a whole oat flour. Accordingly, the term "whole oat flour" in isolation can refer to unprocessed whole oat flour or whole oat flour in which starch has been hydrolyzed without converting the starch to monosaccharides and disaccharides. For example, as discussed earlier, the soluble whole oat flour (or other whole grain) made in accordance with the methods described herein can maintain its standard of identity as whole grain throughout processing.

Also, for purposes of illustration, the invention is described with reference to "oat" or "barley" embodiments. However, in some embodiments, an "oat" component or "barley" component is replaced with another component or group of components that comprise starch. For example, in some embodiments, an "oat" component or "barley" component is replaced with at least one component selected from the group consisting of "grains," "one and only one grain," "a portion of a grain," and combinations thereof.

Furthermore, for purposes of illustration, some embodiments are described with reference to soluble flour. Examples of soluble flour include flour made from soluble grain (e.g., wheat, oat, barley, corn, white rice, brown rice, barley, millet, sorghum, rye, triticale, teff, spelt, buckwheat, quinoa, amaranth, kaniwa, cockscomb, green groat and combinations thereof). When the term soluble flour is used, flours of any of these whole grains, a portion of any of these grains, and/or any combination thereof can be substituted as applicable in context.

With respect to the products of the soluble oat flour made in accordance with the methods disclosed herein, the term "hot beverage" or "hot comestible" shall mean a beverage or comestible that is typically served or consumed between about 55° C. and 85° C. Similarly "cold beverage" or "cold comestible" as used herein shall refer to a beverage or comestible that is typically served or consumed between about 4° C. and 25° C. The skilled food technician would recognize, however, that although the beverages and comestibles are intended to be consumed at the temperature ranges discussed above, the respective beverages and comestibles can be served and consumed at temperatures outside of these ranges based on consumer preference or circumstance.

Initially, enzyme-treated oat or barley flour can be prepared by combining a whole oat or barley flour starting mixture and a suitable enzyme solution in a mixer (e.g., a pre-conditioner) and then heating the mixture. The enzyme-treated mixture is then subjected to an extrusion process to gelatinize, hydrolyze, and cook the oat or barley flour mixture. In some embodiments, a suitable amount of time is provided before extrusion. Then, after a suitable amount of time to begin to break down and hydrolyze the oat or barley flour, the enzyme-treated mixture is subjected to an extrusion process to continue to break down and hydrolyze the oat or barley flour and to gelatinize and cook the mixture.

A suitable starting mixture can be prepared by combining the whole oat or barley flour with other desired ingredients. For example, a typical starting mixture contains whole oat or barley flour and granulated sugar. Maltodextrin and/or at least one antioxidant can also be added.

The whole oat or barley flour can be present in an amount of about 50% to about 100% by weight of the total weight of the starting composition. In further aspects, the whole oat flour can be present in amounts of about 80% to about 95% by weight or about 90% to about 95% by weight.

The sugar can be any suitable sugar known to those skilled in the art. Non-limiting examples of sugars include sucrose, fructose, dextrose, other sugars known in the art, and combinations thereof. Typically, the sugar is present in an amount of about 1% to about 15% by weight or about 3% to about 15% by weight of the total weight of the starting composition. In further aspects, the sugar is present in amounts of about 3% to about 7% by weight.

The maltodextrin can be present in an amount of about 0% to about 15% by weight of the total weight of the starting composition. In further aspects, the maltodextrin is present in amounts of about 3% to about 7% by weight.

The antioxidant can be any suitable antioxidant such as mixed natural tocopherols or artificial antioxidant such as BHT and BHA. The antioxidant can be present in an amount from 0.1% to 2% by weight. In further aspects, the antioxidant can be present in amounts of about 0.25% to about 0.75% by weight.

A suitable, but non-limiting, flour mix formula for extrusion process.

| Ingredient | % |
| --- | --- |
| Whole oat flour | 89.35 |
| Sugar | 5.00 |
| Maltodextrin | 5.00 |
| Mixed tocopherols | 0.50 |
| α-amylase | 0.15 |
| Total | 100.00 |

The enzyme can be any suitable enzyme to hydrolyze the starch in the oat or barley flour and does not change or adversely affect the beta-glucan that is present in the oat or barley flour. Suitable enzymes include α-amylase in the range of about 0.01-0.5%, for example about 0.1-0.2%. In one aspect of the present disclosure, the α-amylase used can be Validase 1000L having approximately 1,000,000 MWU/g (MWU—Modified Wohlgemuth Unit). Whether the beta-glucan has changed by the hydrolysis can be determined by any suitable method such as by analyzing the structure of the beta-glucan. This can be done by laser light scattering mass spectroscopy. The enzyme can be added to water to form an enzyme water solution. Then the enzyme-water solution can be combined with the starting mixture in the pre-conditioner.

In some embodiments, the starting mixture and enzyme solution is heated to between about 120° F. and about 200° F., in particular to between about 140° F. and about 180° F., e.g., 165° F. for about 3 to 5 minutes to initiate gelatinization of starch. The enzyme then reacts on gelatinized starches to hydrolyze (e.g., break down) some of the starch molecules, for example, the high molecular weight amylopectin starch fractions (e.g., having an average molecular weight of $5.8$-$6.2 \times 10^6$ Dalton) into low molecular weight starch molecules, for example, low molecular weight amylopectin starch fractions (e.g., having an average molecular weight of $1.7$-$2.0 \times 10^6$ Dalton).

In some embodiments, the starting mixture and enzyme solution can be mixed in any suitable vessel such as a high speed mixer that permits liquid to be added to free-flowing flour. In some embodiments, the suitable vessel is called a preconditioner. The output is a free-flowing wetted flour mixture having a moisture content of about 25 to about 40%. The residence time is the time sufficient to obtain the desired result and typically 1 to 5 min.

The enzyme-treated mixture is subsequently added to an extruder (continuous cooker) to gelatinize, hydrolyze, and cook the starch. The mixture resides in the extruder for a time sufficient to gelatinize and cook the starch, but not long enough to dextrinize or otherwise modify the starch to void the whole grain aspect, generally at least 1 minute, typically, about 1 to about 1.5 minutes, to form a dough. Generally, the material is heated from an initial inlet temperature to a final exit temperature in order to provide the energy for starch gelatinization.

Starch gelatinization requires water and heat. In some embodiments, the gelatinization temperature range for grains (e.g., oats, barley, wheat, etc.) is 127° F. to 160° F. (53-71° C.), or 127° F. to 138° F. (53-59° C.). If the moisture is less than about 60% then higher temperatures are required.

Heat can be applied through the extruder barrel wall such as with a jacket around the barrel through which a hot medium like steam, water or oil is circulated, or electric heaters imbedded in the barrel. Typically the extrusion occurs at barrel temperatures between 140° F. and 350° F., for example between 175° F. and 340° F., more specifically about 180° F.-300° F. In some embodiments, the extrusion occurs at barrel temperatures between 140° F. and 250° F. Additionally, in some embodiments, the dough temperatures are approximately between 212° F. and 260° F.

Heat is also generated within the material by friction as it moves within the extruder by the dissipation of mechanical energy in the extruder, which is equal to the product of the viscosity and the shear rate squared for a Newtonian fluid. Shear is controlled by the design of the extruder screw(s) and the screw speed. Viscosity is a function of starch structure, temperature, moisture content, fat content and shear. The temperature of the dough increases in the extruder to approximately 212° F. and 300° F. Although, in some embodiments, the dough temperatures are approximately between 212° F. and 260° F.

Low shear is applied to the mixture in the extruder. As the enzyme has preconditioned the starch, high shear is not required for this process. High shear makes it difficult to control the degree of hydrolysis. It can also increase the dough temperature excessively, which can overcook it resulting in too much cooked grain flavor. As another example, high shear can dextrinize the starch, which can be undesirable in some embodiments. It is noted that the barrel temperature and the dough temperature can be different.

In some embodiments, the process balances limiting the dough temperature to avoid too much cooked grain flavor and to keep the enzyme active. For example, the process can be balanced such that the dough temperature rises to a sufficient temperature to deactivate the enzyme. Such temperatures are at least 280° F., generally 212° F. to 300° F. A low shear extrusion process is characterized relative to high shear extrusion by high moisture and a low shear screw design versus low moisture and a high shear screw design.

Any suitable extruder can be used including suitable single screw or twin screw extruders. Typical, but not limiting, screw speeds are 200-350 rpm (e.g., 200-300 rpm).

The resulting product can be pelletized using a forming extruder and dried, typically to about 1.5 to about 10%, for example 6.5 to 8.5%, moisture content. The pellets can be granulated to a max 5% through a US 40 screen. The particle size of the resulting granulated product is about 10-500 microns, for instance, about 1-450 microns, more particularly about 30-420 microns. Although, in some embodiments, the pellets are granulated to a max 85% through a US 30 screen.

Jet milling can be used to mill the pellets produced in accordance with aspects of the present disclosure. Jet milling creates ultrafine particles. In particular, jet milling reduces the particle size of the pelletized soluble grain flour (e.g., oat, barley, or wheat flour) to less than about 90 micron, for example, less than about 50 microns, such as about 46 microns. As one of ordinary skill in the art would recognize, alternative milling processes can be used to reduce the particle size or micronize the flour to, 0.5-50 microns, such as between 10 to 50 microns.

The resulting soluble oat flour includes beta-glucan soluble fiber, such as beta-1, 3-glucan, beta-1, 6-glucan, or beta-1, 4-glucan or mixtures thereof. In addition to beta-glucan naturally present in the oats, beta-glucan can also be added as approved by the FDA. In certain embodiments, the oat flour preferably contains at least about 3% to 5% or about 3.7% to 4% beta-glucan. In certain embodiments, the oat flour containing liquid, semi-solid, or solid product contains 0.1% to about 1.5% beta-glucan, or about 0.8% to 1.3% beta-glucan. Other amounts of beta-glucan are also useful.

In some embodiments, the soluble grain flour (e.g., oat flour) disperses in less than about 5 seconds in a liquid media at 25° C.

The product (e.g., soluble oat or barley flour) prepared in accordance with the process described above can be utilized in a variety of products such as: fruit juices, dairy beverages, carbonated soft drinks, ready-to-drink (RTD) beverages (for example, dairy-based beverages and juice-based beverages); powders such as for cold and hot instant beverages, instant pudding, custards, mousses, or gelatin, or as an additive to smoothies or shakes for example; dairy products such as yogurt, ice cream, oat-milk, and processed cheeses such as cream cheese; bakery products such as crackers, cookies, muffins, breads, pizza crust, bagels, cakes, crepes, and pancakes; ready-to-eat (RTE) snacks such as pudding, fruit leather, and fruit gel snacks; starters or side dishes such as soups (including, without limitation instant soups and ready-to-eat soups) and congee; seasoning mixes, dressings, and sauces; grain-based foods such as upma and hummus; meat-based foods such as meat balls; polenta; and fillings for food products such as mousse, cream, and fudge. The soluble oat or barley flour can also be used as texture modifiers for bakery products or as a replacement for gums, such as guar gum, for instant oatmeal products. Moreover, the soluble oat or barley flour can be used as a fat replacer in products such as cream-based dips. This list is not all-inclusive and one skilled in the art would recognize that the soluble oat or barley flour can be added to other beverages and food products in accordance with the invention.

In some embodiments, a beverage, for example, contains from about 1% to about 25% soluble oat or barley flour and from about 70% to about 95% total water, typically about 75% to about 90% total water, based on weight of the total drinkable beverage. The balance can contain sweeteners, flavors, fruits and other materials as desired.

The water should be suitable for use in food. The total water can come in part or in whole from other parts of the drinkable food, especially if milk, juices, or other water containing components are used. For instance, the milk can be dairy (e.g., whole, 2%, 1%, or non-fat) or non-dairy (e.g., soy). The milk can also be produced from powdered milk and water.

The beverage can also include a fruit component. The fruit component can include fruit juice, yogurt containing fruit, fruit puree; fresh fruit, fruit preserves, fruit sorbet, fruit sherbet, dried fruit powder, and combinations thereof. Typically, the fruit component has particles sufficiently small that the component can be safely swallowed without chewing. The fruit component and/or an added acidulant can be adjusted to obtain a desired pH, for example a pH of less than about 4.6.

Food products include cereals and ready-to-eat snack bars. A suitable amount of the granulated product is added to the food mixture.

Additional ingredients can be added to the beverage and food products. Such ingredients can include non-grain-based ingredients. For example, flavoring agents, coloring agents, sweeteners, salt, as well as vitamins and minerals can be included. In one embodiment of the invention, flavoring agents such as strawberry, chocolate or cinnamon flavor is added to enhance the taste of product. Other fruit flavoring agent can also be useful to provide different tastes to the food product, for example, strawberry, mango and banana and mixtures thereof. Spices, in particular, cinnamon, can be used. In addition, any desired flavor or flavors can be used. Suitable sweeteners—artificial or natural can be added in the food product to provide a desired sweetness. For example, brown sugar, maple sugar or fruit sugar can be used. The non-grain based food component can be added in the range of about 10 to 75 wt % of the total weight of the product.

Other optional ingredients, include, but are not limited to, salt, hydrocolloids, polysaccharides, thickeners, caffeine, dairy, coffee solids, tea solids, herbs, nutraceutical compounds, electrolytes, vitamins, minerals, amino acids, preservatives, alcohol, colorants, emulsifiers, and oils as known in the art.

The soluble oat or barley flour includes beta-glucan soluble fiber, such as beta-1, 3-glucan, beta-1, 6-glucan, or beta-1, 4-glucan or mixtures thereof. In addition to beta-glucan naturally present in the oats or barley, beta-glucan can also be added as approved by the FDA. In certain embodiments, the oat flour preferably contains at least about 3% to 5% or about 3.7% to 4% beta-glucan. In certain embodiments, the oat flour containing liquid product contains 0.1% to about 1.5% beta-glucan, or about 0.8% to 1.3% beta-glucan. Other amounts of beta-glucan are also useful.

As described, the present invention provides both healthy drinkable and edible beverage and food products which are convenient to consume on-the-go, making it especially appealing to consumers with today's hectic lifestyle. Some embodiments of the invention will now be described with reference to examples of food and/or beverage products.

In one embodiment, a cracker formula is typically made from whole wheat flour or wheat gluten. Instead the formula would be replaced with this hydrolyzed oat flour (e.g., soluble oat flour) to improve nutritional benefits (heart health) as well as provide adequate strength to the dough be sheeted and cut into crackers. The formula would include:

| | |
|---|---|
| Modified corn starch | 10.00 |
| Oat flour, Hydrolyzed | 48.00 |
| Oat flakes, old fashioned | 17.00 |
| Brown sugar, free-flowing | 12.00 |
| Malt powder, Briess #10001 | 4.00 |
| Lecithin, powdered, Centrolex | 2.00 |

-continued

| | |
|---|---|
| Sodium aluminum phosphate | 0.80 |
| Sodium bicarbonate | 0.70 |
| Salt, flour | 0.50 |
| Corn Oil, with TBHQ, ADM | 5.00 |
| Total | 100.00 |

As another example, one embodiment of the invention provides a formula for oat ice cream comprising hydrolyzed oat flour (e.g., soluble oat flour) as follows.

| Ingredient | % |
|---|---|
| 2% Milk | 87.0 |
| Oat flour, hydrolyzed | 6.5 |
| Sugar | 5.4 |
| Cocoa powder | 0.8 |
| Flavor | 0.2 |
| Modified starch | 0.1 |
| Total | 100.0 |

It was discovered that the use of the soluble flour (e.g., a soluble flour comprising, consisting essentially of, or consisting of grain, and/or at least a portion of grain, for example bran) prepared in accordance with the method described above provides unexpected processing improvements and properties over unprocessed oat flour or soluble oat flour prepared by other methods.

For example, flour used in RTE or RTD products is typically pasteurized or sterilized in order to kill microorganisms that could cause disease or spoilage. This high heat process ensures that the flour is safe and healthy to consume. Such pasteurization and sterilization cannot be easily done on dry flour. Hence, prior to pasteurization or sterilization, the flour needs to be completely hydrated to ensure appropriate heat transfer through the flour during the kill step. Full hydration and complete gelatinization of the flour are desired to ensure the viscosity of the product will not dramatically increase during further processing.

Flour is typically hydrated by dispersing the flour in water and heating the slurry using an appropriate time and temperature combination that results in starch gelatinization. Typically the temperature is 90° C. and the time to hydrate fully is at least 25 minutes. Lower hydration temperatures will require longer times. Then the slurry needs to be cooled down to blend the other ingredients. Then the flour slurry can be pasteurized or sterilized by any suitable means such as High Temperature Short time (HTST) pasteurization or Ultra High Temperature (UHT) sterilization. Pasteurization or sterilization is a necessary step for RTD or RTE liquid or semi-solid foods.

It was discovered that soluble flour made in accordance with the process described above hydrates without the need of a lengthy heating process of standard or typical grain flour (e.g., oat, barley, or wheat flour). For example, in flour comprising at least a portion of a grain (e.g., bran, whole grain, etc.), the quality of the at least a portion of the grain is maintained, that is the integrity of the flour is maintained throughout the process. Accordingly, in some embodiments, although starch molecules in the flour can be hydrolyzed to smaller starch molecules with smaller molecular weights, the relative mass ratio of the starch to other components in the flour remains substantially constant, or essentially constant, or constant. As an illustration, when the flour is a grain flour, whole grain status can be maintained throughout the process (e.g., hydrolysis, pelletizing, grinding, and/or milling process). With soluble flour, the flour can be hydrated at a lower temperature, for example, the temperature can be around chilled to room temperature, typically 4 to 30° C. reducing the total processing time by 1.5 hours. Typically the amount of soluble flour in the water is 2 wt % to 10 wt %, or 3 wt % to 9 wt %, or 4 wt % to 8 wt %. Then the flour can be further processed to prepare the RTE or RTD product.

Figure 2:
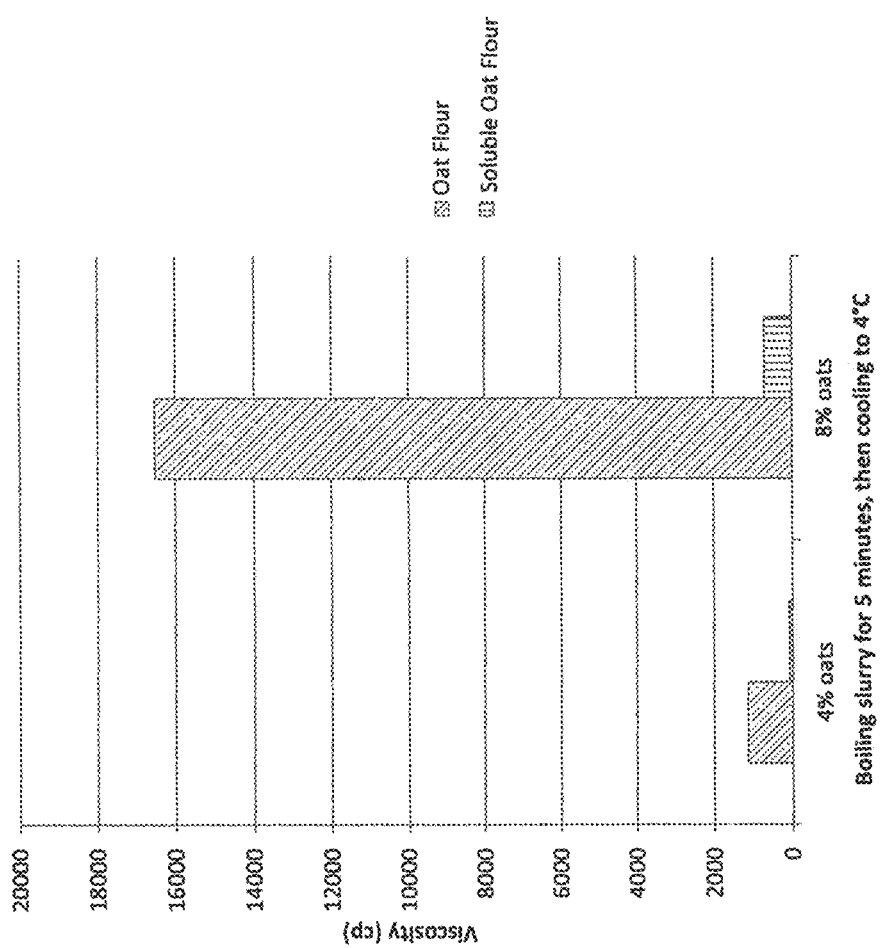
FIG. 2 depicts the viscosity of oat flour and soluble oat flour slurries after hydration.

Furthermore, it was discovered that after hydration, a slurry comprising, consisting essentially of, or consisting of a water and flour with gelatinized, hydrolyzed starch (e.g., the soluble flour slurry) has a much lower viscosity compared to a standard or typical flour slurry. For example, the soluble oat flour slurry has a much lower viscosity (in relative and/or absolute terms) compared to standard or typical oat flour slurry. Attention is drawn to FIG. 2 which demonstrates that standard oat flour produced a much higher viscosity than soluble oat flour especially at higher concentrations of oats. In fact, the viscosity of the soluble oat flour slurry at 8 wt % oats is lower than the viscosity of oat flour at 4 wt % oat concentration.

Such improved viscosity and hydration results were not expected and has thus allowed the soluble flour to be used in products to provide better properties such as better hydration and mixing properties, particularly without the need of elevated temperatures. The viscosity of hydrated soluble oat flour in water in amounts of 2 wt % to 10 wt % will generally range from 100 to 1600 cP at 24° C.

For typical oat flours, high shear mixing must be used with the hydrated flour prior to adding to beverage ingredients, to reduce viscosity. Because of the relatively low viscosity of the soluble oat flour, there is no need for such a high shear mechanical process step to reduce viscosity driven by starch. Gentle mixing is sufficient.

Therefore, benefits of using soluble flour, for example, soluble grain flour, for beverages instead of typical flour, for example, typical grain flour (e.g., typical oat flour), include simplified manufacturing processes and less capital investment for heating, mixing and cooling equipment.

Soluble flour, for example, soluble grain flour, is very effective in dairy beverages because no high temperature heating is required. As discussed above, typically high temperature and time is involved in ungelatinized grain flour hydration (e.g., oat flour hydration, barley flour hydration, etc.). If one wants to use typical grain flour (e.g., typical oat flour) in a dairy beverage, it is recommended to hydrate the grain flour (e.g., the oat flour) in water because heating fluid milk to the high temperatures required for hydration results in cooked milk flavors. To be able to produce a beverage with high concentration of dairy components, the dairy components must be added as a dairy powder. In contrast, soluble flour, for example, soluble grain flour, allows hydration to occur directly in the fluid milk, producing a product with better sensorial properties, for instance, a fresher flavor is associated with the product since the cold milk has not been subjected to a severe heat hydration treatment and therefore does not have the cooked notes commonly associated with heat treating milk. Attention is drawn to U.S. Ser. No. 13/547,733 which is hereby incorporated by reference in its entirety as an example and which describes the benefits of hydrolyzed oat flour in dairy beverages.

Soluble flour can also be used in juice beverages. In one embodiment, soluble flour, for example, soluble grain flour, can be hydrated in the juice at ambient temperatures or cold temperatures. The juice can be any suitable juice or juice/puree combination. Suitable juices can be acidic or non-acidic, fruit, vegetable, or combinations thereof. Non-limiting examples of juices and purees include, Acai, Aloe Vera Juice, Apple, Apricot Nectar, Bancha, Beet, Black Cherry, Black Currant, Blackberry, Blueberry, Boysenberry, Carrot, Celery, Coconut, Cranberry, Cucumber, Elderberry, Gogi Berry, Grape, Grapefruit, Kiwi, Strawberry, Tomato, Raspberry, Lemon, Lime, Mango, Orange, Papaya Nectar, Passion fruit, Pear, Pineapple, Plum, Pomegranate, Potato, Prune, Pummelo, Radish, Razzleberry, Sorrel, Spinach, Tangerine, Tomato, Turnip, Watercress, Watermelon, and Wheat Grass. Purees are well-known to those skilled in the art and are generally prepared from smashed or mashed fruits and vegetables.

As an example, suitable RTD juice products such as juice-based or milk-based smoothies can be prepared with ½ serving of whole grain oats per 8 oz. serving.

| Ingredient | wt % |
| --- | --- |
| Fruit Juice | 65-80 |
| Fruit Puree | 10-30 |
| Soluble Oat Flour | 3.71 |

Flavors, colors, texturizers, anti-foaming agents, fruit pieces or other inclusions, and other additives can be added as is within the skill of the art. It is understood that the juice-based beverages can be made with many types of additives. Artificial and natural, non-nutritive and nutritive, sweeteners can be added if desired. Texturizers can be gums or starches. As noted below, the soluble oat flour can also wholly or partially replace certain texturizers such as gellan gum. The amount of soluble grains (e.g., soluble oats) added can be to provide up to 1 serving of whole grain (e.g., whole grain oats) per 8 oz. serving. Generally, the juice can include up to 8 wt % soluble grain (e.g., soluble oats), generally 1 to 8%, or 2 to 4 wt %.

Hence, soluble flour, for example, soluble grain flour, provides unexpected benefits for liquids such as beverages or yogurts. As discussed above, there is no need to hydrate soluble oat flour in water at high temperature. Instead room temperature or temperatures of 4 to 30° C. are suitable. Second, there is no need for a mechanical process step to reduce viscosity driven by starch. Third, there is no need of a cooling process of a heated oat slurry.

Figure 3:
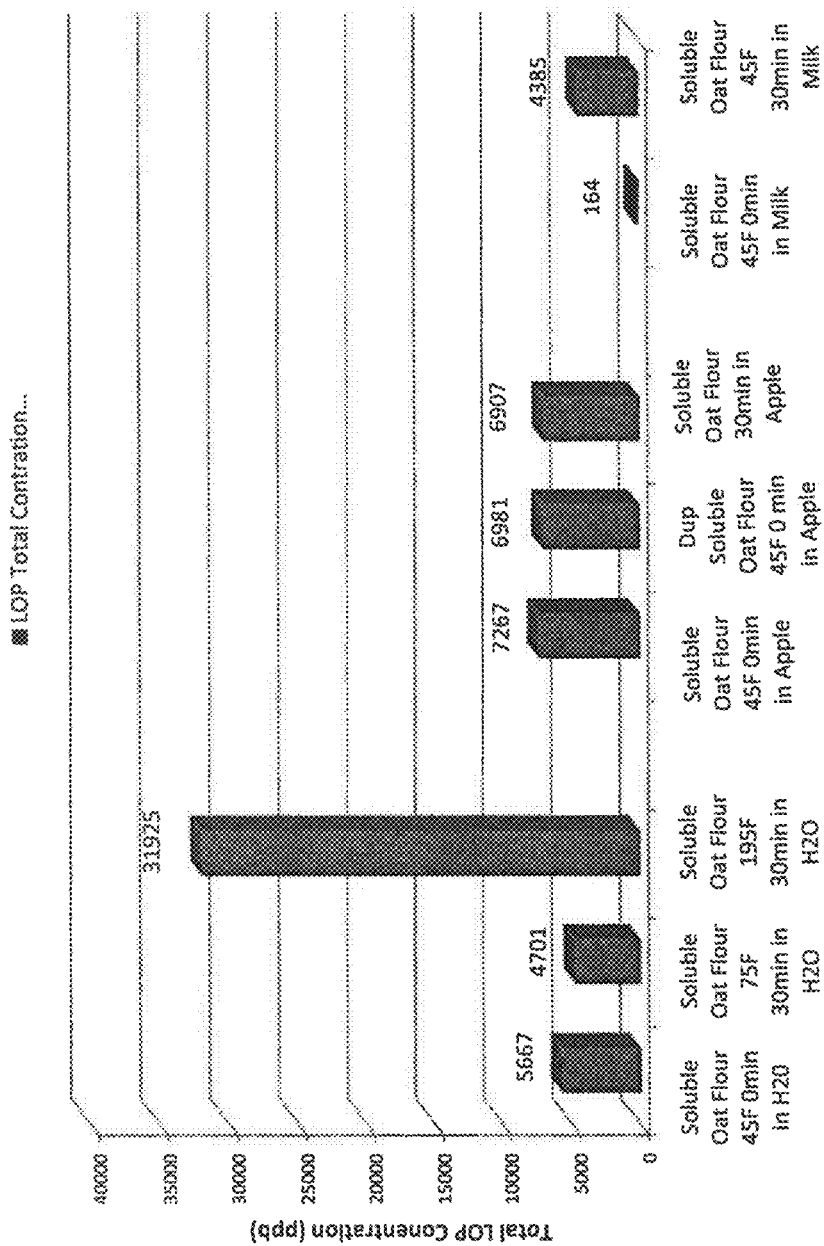
FIG. 3 depicts the analysis of lipid oxidation product ("LOP") in various hydration conditions for soluble oat flour.

FIG. 3 provides an analysis of lipid oxidation product under various hydration conditions. It is shown that the degree of oxidation of the soluble oat flour slurry is driven by hydration temperature and time. That is, FIG. 3 shows that a less oxidized compound was identified with juice samples prepared by cold juice hydration when compared to that prepared by high temperature water hydration.

Soluble flour, for example, soluble grain flour, as described herein can also be added to instant powders such as to provide instant cold beverages (e.g., chocolate milk) or whole grain oat "shots" for smoothie or other beverages. In some embodiments, the consumer purchases the instant powder and mixes it with a liquid, including, without limitation, water, juice, or milk. In some embodiments, soluble flour, for example, soluble grain flour, provides less and slower sedimentation of insoluble solids and further provides a less grainy or gritty mouthfeel compared to other flours, for example, grain flours (e.g., oat flours). Soluble oat flour also provides a slight oatmeal flavor bringing authenticity to the product versus a "raw flour" flavor when using oat flour. One aspect of the instant powder is provided below:

| Ingredient | wt % |
| --- | --- |
| Soluble Oat Flour | 50-70 |
| Sugar | 30-45 |
| Salt | 0.6-0.8 |
| Stabilizers | 0.7-0.9 |
| Flavors | 2.5-5 |

Figure 4:
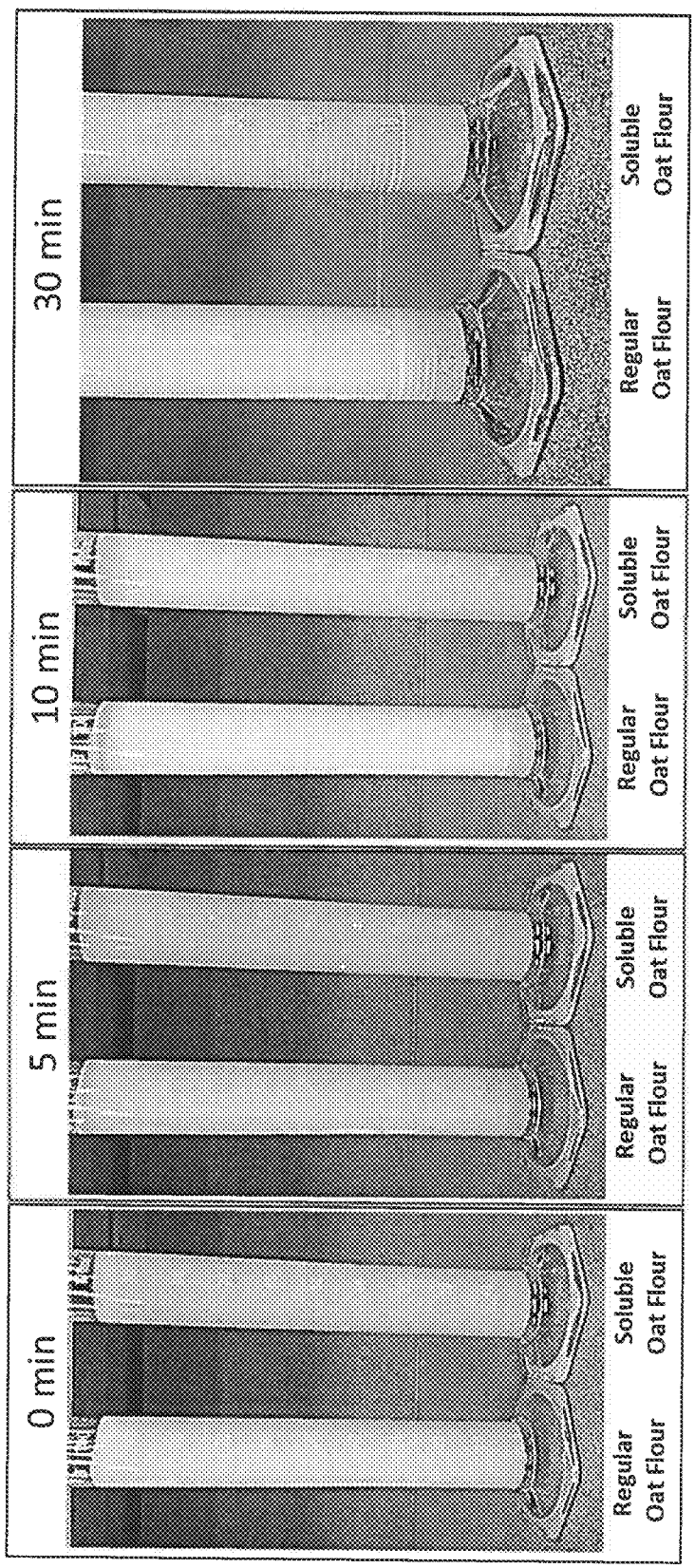
FIG. 4 is a photograph illustrating the amount of sedimentation observed when regular oat flour is mixed in cold water versus when the soluble oat flour is mixed with cold water.

Sensory testing (n=13) was performed on a cold instant beverage containing the soluble oat flour of the instant application compared to regular oat flour. FIG. 4 illustrates that the amount of sedimentation observed when regular oat flour was mixed with cold water was much greater than the sedimentation observed when soluble oat flour was mixed with cold water. Specifically, FIG. 4 shows the sedimentation of a sample containing regular oat flour and soluble oat flour suspensions after 5, 10 and 30 minutes following preparation. The separation of phases in the regular oat flour sample was observed after only 5 minutes following preparation. Additional results of the sensory tasting are shown in Table 1 below.

TABLE 1

Table 1

| Question | Regular Oat Flour | Soluble Oat Flour |
| --- | --- | --- |
| Which samples is grittier? | 58% | 42% |
| Which sample has a smoother mouthfeel? | 38% | 62% |
| Which sample has a more "raw flour" flavor? | 69% | 31% |

Figure 5:
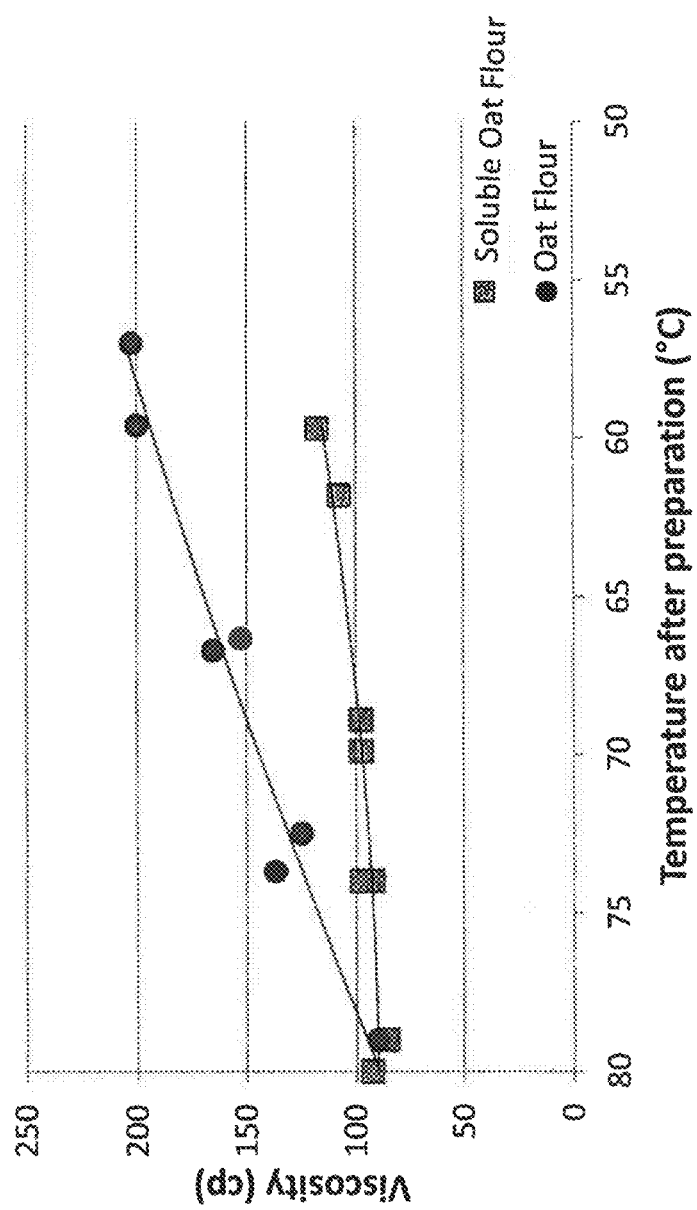
FIG. 5 depicts viscosity of instant hot beverages containing unprocessed oat flour and soluble oat flour after the beverages cool down.

Soluble flour, for example, soluble grain flour, as described herein can also be added to instant powders such as to provide instant hot beverages. Soluble flour, for example, soluble grain flour, provides less and slower sedimentation of insoluble solids and lower viscosity at temperatures at which hot beverages are customarily consumed. That is, there is a minimal viscosity increase as a beverage cools down when compared to typical flour processed by conventional oat milling methods. For example, FIG. 5 illustrates there is a minimal viscosity increase as a beverage comprising soluble oat flour cools down when compared to a beverage comprising typical flour processed by conventional oat milling methods.

Soluble flour, for example, soluble grain flour, included in powders for instant cold beverages can comprise 25 to 90 wt % of the total powder weight. In particular, soluble flour, for example, soluble grain flour in a powder for instant cold beverages such as chocolate milk can comprise 50 to 70 wt % of the total powder weight as noted in the example above. Additionally, soluble flour, for example, soluble grain flour, included in powders as shots for addition to already prepared beverages can comprise 50 to 100 wt % of the total powder weight.

Notably, typical oat flour dispersed in hot water will significantly increase the viscosity of the liquid as the temperature decreases, typically, the viscosity will more than double as the temperature decreases (e.g., increases over 100%). In contrast, the soluble flour, for example, soluble grain flour, when dispersed in hot water in the same amount, will not significantly increase the viscosity of the liquid as the temperature decreases (e.g., increases no more than 40%)

| Ingredient | wt % |
| --- | --- |
| Non-fat dry milk | 30-36 |
| Soluble Oat Flour | 28-32 |
| Sugar | 21-28 |
| Cocoa powder | 7-9 |
| Stabilizers | 1-4 |
| Salt | 0.1-.5 |

Flavors, colors, powdered milk, anti-foaming agents, stabilizers, salt, and other additives can be added to the instant powders for hot and cold beverages as is within the skill of the art. It is understood that the powders can be made with many types of additives. Artificial and natural, non-nutritive and nutritive, sweeteners can be used if desired. The amount of soluble oats depends on the amount desired in the final product. For example, a ½ to full serving of soluble whole grain (e.g., soluble oats) included in powders intended for hot beverages can comprise 25 to 50 wt % of the total powder weight for instance 28 to 32 wt % of the total powder weight. Again, a benefit to soluble powders, for example, soluble grain powders (e.g., soluble oat powders) is easy hydration when added to water or other liquids.

Figure 6:
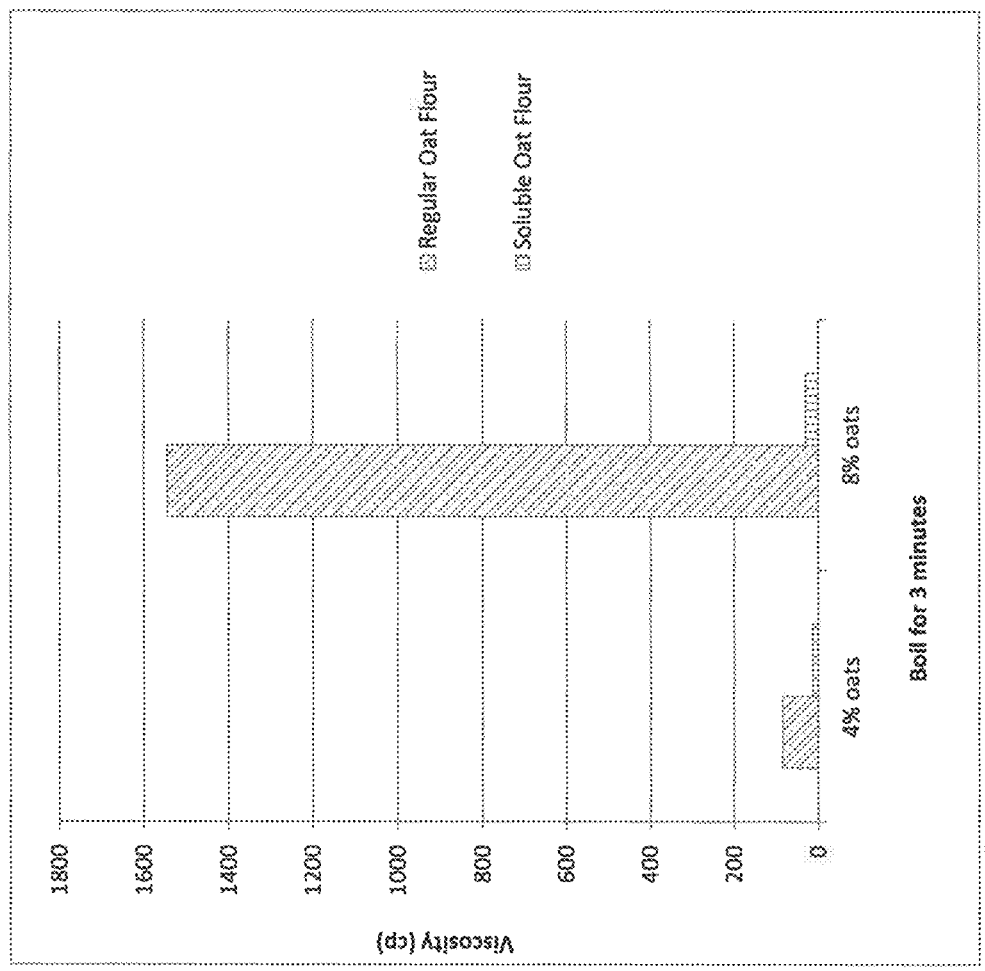
FIG. 6 depicts the viscosity of oat flour and soluble oat flour slurries after boiling in water for three (3) minutes.

Soluble flour, for example, soluble grain flour, can also be used in side dishes and entrees such as soups and congee. The easy hydration and lower viscosity of the soluble flour, for example, soluble grain flour, allows addition of higher amounts of whole grain (e.g., whole grain oats) per serving size providing increased health benefits. The soluble flour can be used in both instant soups and ready-to-eat soups. In one aspect, a ready-to-eat soup comprising about 2 to 10 wt % of soluble oat flour based on total weight of the soup wherein the soluble oat flour provides at least ½ serving of whole grains can be prepared. Attention is drawn to FIG. 6 which demonstrates that standard oat flour produced a much higher viscosity than soluble oat flour especially at higher concentrations of oats. Further, 4% soluble oat flour per 8 oz. serving will ensure delivery of a ½ serving of whole grains which is about 8 grams of oats. Similarly, 8% soluble oat flour per 8 oz. serving will ensure delivery of 1 whole serving of whole grains which is about 16 grams of oats. The viscosity measurements shown in FIG. 6 were taken immediately after boiling for 3 minutes.

A butternut squash soup can be prepared as follows:

| Ingredient | wt % |
| --- | --- |
| Chicken or vegetable broth | 45-60 |
| Butternut squash | 30-40 |
| Onions | 7-10 |
| Soluble Oat Flour | 3-5 |
| Butter and oil | 1.2-1.5 |
| Garlic | 0.2-1 |
| Salt | 0.2-0.6 |
| Spices | 0.01-0.05 |

Suitable spices can be a combination of cinnamon, allspice, cayenne pepper, and black pepper. Any of the ingredients can be modified or replaced as appropriate for the particular desired result.

Soluble flour, for example, soluble grain flour, can also be used in semi-solid dairy products such as yogurt, ice cream, or spreads. In some embodiments, the benefits of using the soluble flour of the instant application in semi-solid dairy products include easy hydration and/or minimal to no increase of viscosity during processing as shown in FIG. 5.

For example, yogurt can be prepared with a ½ serving of whole grain oats per 6 oz. serving:

| Ingredient | wt % |
|---|---|
| Milk/Other dairy | 89.1 |
| Soluble Oat Flour | 5.3 |
| Sugar | 5 |
| Texturizers | 0.6 |
| Yogurt Culture | Mfr spec. |

Flavors, colors, texturizers, fruit preparations, fruit pieces or other inclusions, and other additives can be added as is within the skill of the art. It is understood that the yogurt can be made with many types of additives and that the amounts of the ingredients can vary. The sugar can be wholly or partially replaced with any suitable artificial and natural, non-nutritive and nutritive, sweeteners. Texturizers can be gums or starches. As noted below, the soluble flour, for example, soluble grain flour, can also wholly or partially replace certain texturizers such as guar gum. The amount of soluble components, for example, soluble grain (e.g., oats) added can be to provide up to 1 serving of whole grain oats per 6 oz. serving. Generally, for example, the yogurt can include up to 11 wt % soluble oats, generally 2 to 11%, or 2.5 to 6 wt %.

Soluble flour, for example, soluble grain flour, as described herein can also be added to instant powders such as to provide instant puddings. Such products provide a smoother texture with a reduced grainy or gritty mouthfeel.

| Ingredient | wt % |
|---|---|
| Modified starches/maltodextrin | 45-50 |
| Sugar | 20-25 |
| Soluble Oat Flour | 20-25 |
| Tetrasodium pyrophosphate | 0.5-2.0 |
| Flavors | 0.1-2.0 |
| Color | 0.1-2.0 |
| Acetylated monoglycerides | 0.1-1.5 |
| Dipotassium phosphate | 0.1-1.5 |

Moreover, additional testing showed that the instant pudding product made with the soluble oat flour described herein provides a firmer, more pudding-like texture compared to the same product made with regular oat flour using the same amount of texturizers. Table 2 below identifies the result of a sensory testing of the pudding products.

Table 2: Sensory tasting of an instant pudding. Results show percent of responses (n=13).

TABLE 2

| Question | Regular Oat Flour | Soluble Oat Flour |
|---|---|---|
| Which samples is grittier? | 77% | 23% |
| Which sample has a smoother texture? | 23% | 77% |

Flavors, colors, powdered milk, anti-foaming agents, stabilizers, salt, and other additives can be added to the instant powders for pudding as is within the skill of the art. It is understood that the powders can be made with many types of additives. Artificial and natural, non-nutritive and nutritive, sweeteners can be used if desired. The amount of soluble oats depends on the amount desired in the final product. For example, soluble oats included in powders intended for puddings can comprise 10 to 50 wt % of the total powder weight, for instance, 20 to 25 wt % of the total powder weight.

Soluble flour, for example, soluble grain flour, can be added to a variety of bakery products in combination with oat, wheat, and/or other grain flour. Baked products include, but are not limited to, cookies, muffins, breads, bagels, pizza crust, cakes, crepes, and pancakes. Soluble oat flour provides improved texture with typical commercial oat flour versus such oat flour alone.

Texturizers are typically gums or starches (e.g., corn starch). Instead of such typical texturizers, soluble flour, for example, soluble grain flour, can be used to improve the textural properties of baked products. For example, the soluble oat flour can be present in amounts of 2 to 10 wt % as a texturizer.

As an illustration, soluble flour, for example, soluble grain flour, can be used as a texturizer in soft baked cookies. For example, cookies made with oat flour and/or oat flakes to provide ½ serving of whole grain oats (8 g) can have up to about 25 wt % of the oat flour replaced with soluble oat flour. Replacement of a portion of the oat flour with soluble oat flour provides a moister texture. The cookie containing soluble oat flour can also provide a more crumbly texture. In limited instances a chewier texture was also observed. A suitable soft baked cookie recipe:

| Ingredient | wt % |
|---|---|
| Oat flakes and Oat flour | 17-26 |
| Sugars: sucrose, invert sugar, | 17-26 |
| Wheat flour | 15-25 |
| Shortening and oils | 10-16 |
| Food fibers | 5-8 |
| Water | 5-7 |
| Soluble Oat Flour | 2-5 |
| Egg solids | 1.5-2.2 |
| Corn syrup | 1.3-2.0 |
| Leavening agents | 1.2-1.8 |
| Emulsifiers | 0.8-1.2 |
| Salt | 0.3-0.4 |

Sensory testing (n=13) was conducted on cookies made in accordance with the formula above along with cookies made by replacing the soluble oat flour with regular oat flour. The results are included in Table 3 below.

TABLE 3

| Question | Regular Oat Flour | Soluble Oat Flour |
|---|---|---|
| When broken apart, which samples seems more crumbly? | 31% | 69% |
| Which sample has a moister texture? | 23% | 77% |

Any of the ingredients can be modified or replaced as appropriate for the particular desired result.

Soluble flour, for example, soluble grain flour, can be used in muffins. For example, muffins made with oat flour to provide 1 full serving of whole grain oats (16 g) can have up to about 50 wt % of the oat flour replaced with soluble oat flour. Replacement of a portion of the oat flour with soluble oat flour provides a moister texture and more crumbly product. A suitable muffin recipe:

| Ingredient | wt % |
| --- | --- |
| Wheat flour | 15-18 |
| Sugar | 6-8 |
| Leavening agents | 1.8-2.3 |
| Salt | 0.3-0.4 |
| Eggs | 6-8 |
| Milk | 22-28 |
| Butter | 7-9 |
| Blueberries | 9-12 |
| Oat flour | 7-9 |
| Soluble Oat Flour | 7-9 |
| Water | 4-5 |

Sensory testing (n=13) was conducted on muffins made in accordance with the formula above along with muffins made by replacing the soluble oat flour with regular oat flour. The results are included in Table 4 below. Further, the majority of panelists noted that the top of the muffins containing the soluble oat flour had a crustier texture and more coarse appearance.

TABLE 4

| Question | Regular Oat | Soluble Oat |
| --- | --- | --- |
| Which sample has a moister texture? | 42% | 58% |
| Which sample is more crumbly? | 42% | 58% |

Any of the ingredients can be modified or replaced as appropriate for the particular desired result.

Soluble flour, for example, soluble grain flour, can also be used in ready-to-eat high moisture snacks such as RTE puddings, fruit leather, and fruit gels. The lower viscosity of the gelatinized soluble flour, for example, gelatinized grain flour (e.g., oat flour), dispersed in a liquid at the same concentration level as gelatinized typical grains (e.g., oats) allows addition of higher amounts of whole grain (e.g., whole grain oats) per serving. Also, in some embodiments, soluble flour, for example, soluble grain flour, provides improved mouthfeel (less slimy or less slippery mouthfeel and lower undesirable mouthcoating).

A fruit Gel snack can be prepared as follows:

| Ingredient | wt % |
| --- | --- |
| Fruit puree | 43-53 |
| Water | 28-34 |
| Soluble Oat Flour | 8-14 |
| Sugars: sucrose and fructose | 8-10 |
| Acidulants | 0.9-1.1 |
| Flavors | 0.9-1.1 |
| Texturizers | 0.25-0.5 |
| Calcium chloride | 0.1-0.2 |

Sensory testing (n=13) was conducted on fruit gels made in accordance with the formula above along with fruit gels made by replacing the soluble oat flour with regular oat flour. The results are included in Table 5 below.

TABLE 5

| Question | Regular Oat Flour | Soluble Oat Flour |
| --- | --- | --- |
| Which sample is slimier? | 62% | 38% |

Colors, preservatives, and other additives can be as needed or desired. Further, any of the ingredients can be modified or replaced as appropriate for the particular desired result.

Soluble flour, for example, soluble grain flour, can also be used in sauces and seasoning mixes for preparation of various foods such as gravies, creamy sauces, and seasoning mixes added during preparation of rice or pasta.

Soluble flour, for example, soluble grain flour, can also be used as a texturizer in instant oatmeal products. Texturizers improve the overall texture of a bowl of instant oatmeal. The instant oatmeal comprises oat flakes and a powder comprising flavors, sweeteners, and texturizers such as guar gum. The texturizers are generally present in an amount of 0 to 1 wt % based on the total weight of the instant oatmeal dry mix. Soluble flour, for example, soluble grain flour, can replace a portion or all of the guar gum. For example, a suitable instant oatmeal dry mix will contain 0 wt % guar gum and 0.09 wt % to 0.3 wt % soluble oat flour based on total weight of the instant oatmeal dry mix.

Soluble oat flour was used to replace all of the guar gum in instant oatmeal in selected varieties. In some embodiments, soluble oat flour level was 50 to 75% guar gum usage rate. No significant differences were detected. A sensory discrimination test (Triangle test) was used with 60 panelists to evaluate if there were significant differences between oatmeal samples made with guar gum or soluble oat flour. Panelists were presented with 3 samples, from which 2 were the same and 1 was different. Panelists were asked to identify the different sample. No statistically significant differences were found between samples made with guar gum or soluble oat flour in two varieties of instant oatmeal.

Figure 7:
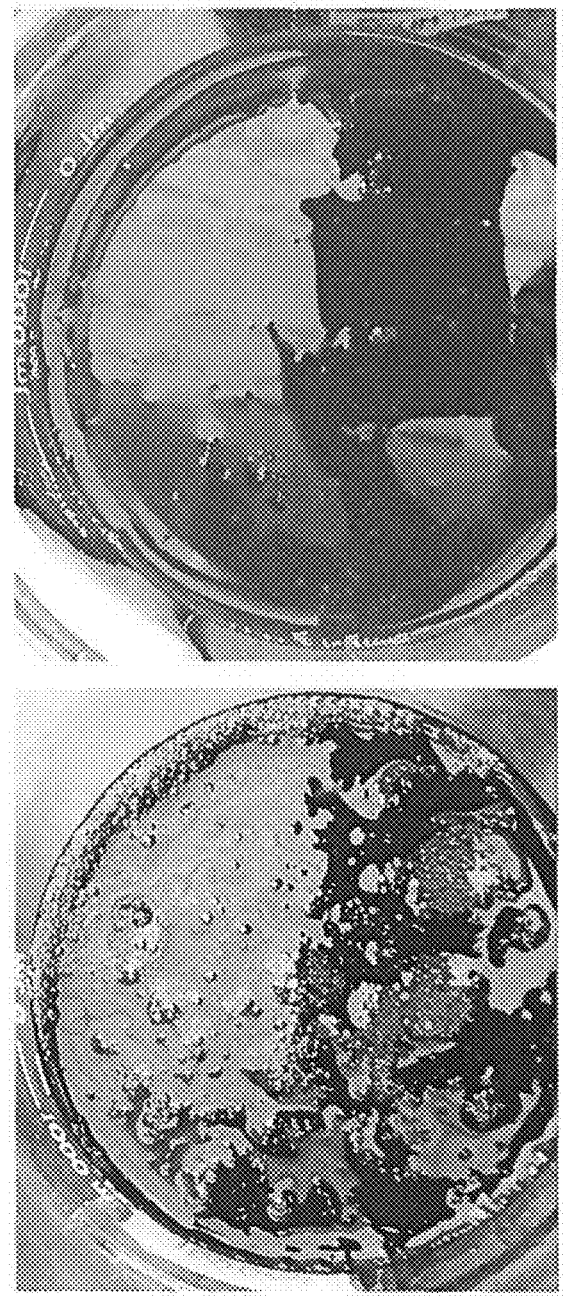
FIG. 7 is a photograph illustrating the antifoaming properties observed when the soluble oat flour is included in a slushie.

Soluble flour, for example, soluble grain flour, can be used in frozen commodities such as slushies and ice cream. In one aspect, a frozen commodity selected from the group consisting of ice cream and slushies comprising soluble oat flour in an amount of 2 to 10 wt % based on total weight of the frozen commodity can be prepared. It was discovered that soluble oat flour can be used in slushie and ice cream products for not only the health benefits of the whole grain oat flour, but because of the lower viscosity benefits during processing of these products, since the soluble oat flour does not require hydration like regular oat flour. Moreover, slushies made using the soluble oat flour of the instant invention exhibited antifoaming properties as illustrated in FIG. 7. The term "antifoaming properties" as used herein refers to the ability of a component to reduce or prevent the formation of air bubbles or foam during processing of liquids or semi-solids.

A ready-to-eat mixed berry slushie can be prepared as follows:

| Ingredient | wt % |
| --- | --- |
| Filtered water | 45 |
| Sucrose | 16 |
| Fruit purees | 14.8 |
| White grape juice | 12 |
| Soluble oat flour | 4.6 |
| Yellow carrot juice | 4.0 |
| Sweet potato concentrate | 2.4 |
| Ascorbic acid | 0.8 |
| Xanthan gum and others | 0.8 |

The water should be suitable for use in food such as water treated by reverse osmosis. The total water can be provided in part or in whole from other parts of the food, especially if milk, juices, or other water containing components are used. For instance, the milk can be dairy (e.g., whole, 2%, 1%, or non-fat) or non-dairy (e.g., soy). The milk can also be produced from powdered milk and water.

Additional ingredients can be added to the beverage and food products. Such ingredients can include grain and/or non-grain-based ingredients. For example, flavoring agents, coloring agents, sweeteners, and salts. Flavoring agents such as fruit flavors, chocolate flavors, or spice flavors can be added to enhance the taste of the product. Fruit flavoring agents include, for example, strawberry, mango, banana and mixtures thereof. Spices, in particular, cinnamon, can be used. In addition, any desired flavor or flavors can be used.

Suitable sweeteners—artificial or natural, nutritive or non-nutritive, can be added in the food product to provide a desired sweetness. For example, brown sugar, maple sugar or fruit sugar can be used. It is noted that the percentage of soluble grain flour (e.g., oat flour, barley flour, etc.) can increase if high intensity sweeteners are used.

Other optional ingredients can include, but are not limited to, hydrocolloids, polysaccharides, thickeners, caffeine, dairy, coffee solids, tea solids, herbs, nutraceutical compounds, electrolytes, vitamins, minerals, amino acids, preservatives, alcohol, colorants, emulsifiers, and oils as known in the art. Fruit and nut components can also be included as well as chips or pieces such as chocolate chips. Fruit components can include fruit puree; fresh fruit, fruit preserves, fruit sorbet, fruit sherbet, dried fruit powder, and combinations thereof. Typically, fruit or nut component have particles sufficiently small that the component can be safely swallowed without chewing. Acidulants can be used to adjust the pH, for example a pH of less than about 4.6 for an acidic beverage—e.g., juices or colas.

Figure 8:
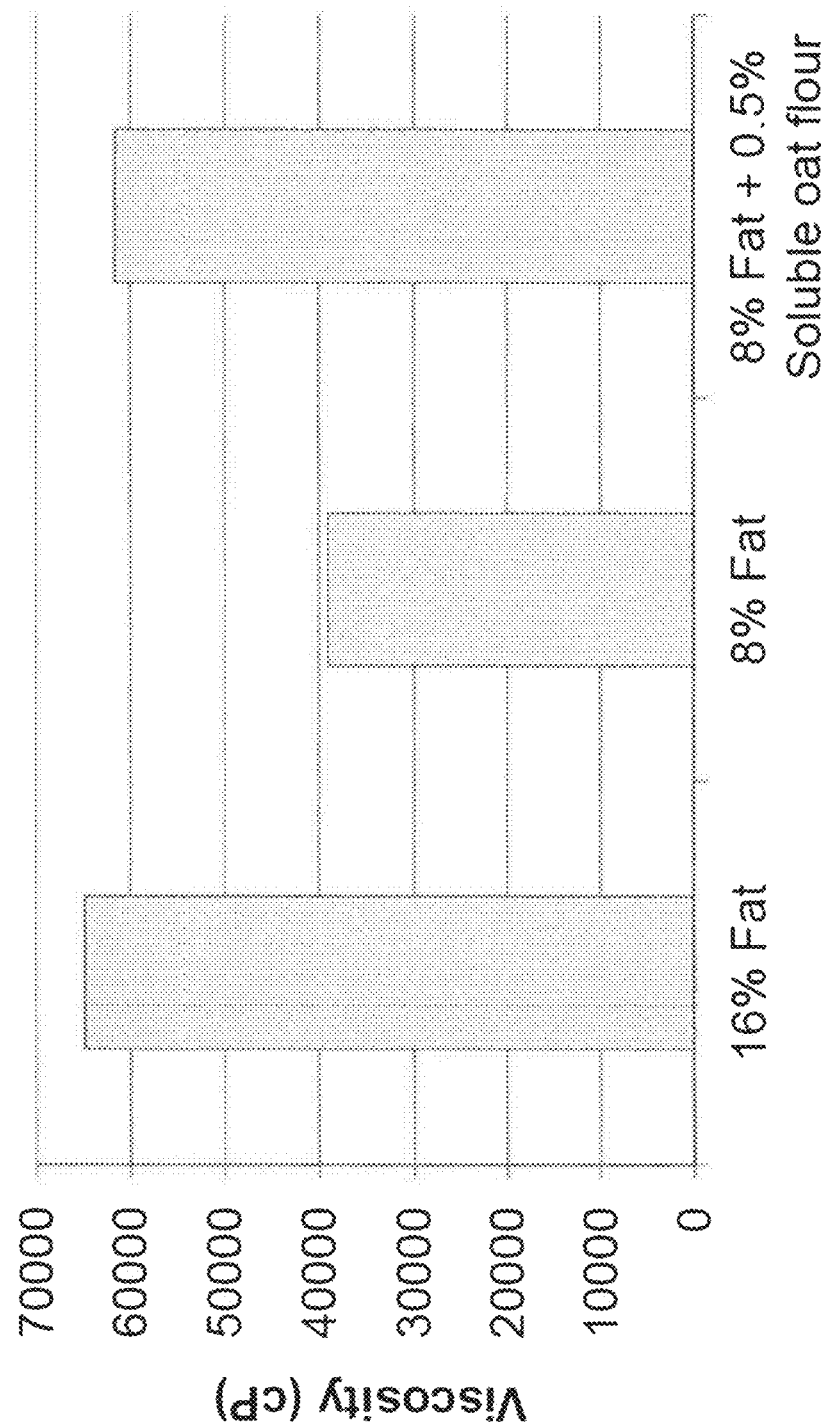
FIG. 8 depicts the viscosities of a full fat dip, a 50% reduced fat dip, and a 50% reduced fat dip containing soluble oat flour.

The soluble flour, for example, soluble grain flour, also can be used as a fat replacer. For instance, the soluble oat fiber was used as a fat replacer in creamy dips to obtain a 50% fat reduction. FIG. 8 depicts the viscosities of a full fat dip, a 50% reduced fat dip, and a 50% reduced fat dip containing soluble oat flour. In particular, a 50% reduced fat dip containing the soluble oat flour described herein exhibited a viscosity similar to the full fat dip.

A reduced fat dip can be prepared as follows:

| Ingredient | wt % |
| --- | --- |
| Water | 77.85 |
| Oil | 8 |
| Starch | 3 |
| Seasoning/flavorant | 4 |
| Protein | 3 |
| Acids | 1.5 |
| Salt | 1.5 |
| Emulsifier | 0.5 |
| Phosphate | 0.3 |
| Gums | 0.2 |
| Soluble oat flour | 0.15 |

Additional Examples

Aspects of the invention relate to food products containing highly dispersible, soluble whole oat flour. In some embodiments, the soluble whole oat flour maintains its standard of identity as whole grain and thus has the characteristics of whole grain oats.

Aspects of the present invention relate to the use of the soluble oat flour in various food products including liquid food products such as beverages, semi-solid food products such as yogurt, and solid food products such as bakery items in order to provide enhanced health benefits. Also, although the invention is described with reference to a composition comprising a grain (e.g., oat or barley), in some embodiments, any starch-containing component, for example, any food grade starch-containing component (e.g., one and only one grain, grains, a portion of a grain, a portion of each of a plurality of grains, and/or combinations thereof) can be substituted for the grain described. For example, in some embodiments, a different grain can be substituted for the grain described. Also, in some embodiments, a plurality of grains can be substituted for the grain described. As another example, in some embodiments, a portion of a grain, for example, bran (e.g., from wheat, oat, corn, rye, rice, and/or barley) can be substituted for the grain described.

Additionally, in some embodiments, additional components can be added to the grain described. Furthermore, in some embodiments, a grain can be added to the grain described. Also, in some embodiments, a plurality of grains can be added to the grain described. As another example, in some embodiments, bran (e.g., wheat, oat and/or barley) can be added to the grain described.

Additional Embodiments

The following clauses are offered as further description of the disclosed invention:

1. A beverage comprising soluble oat flour, wherein the beverage provides ½ to 1 serving of whole grain per 8 oz. serving of the beverage.

2. The beverage of clause 1 wherein the beverage is selected from the group consisting of ready-to-drink juice-based beverages and ready-to-drink milk-based beverages.

3. The beverage of clause 1 wherein the beverage is a juice-based smoothie, a milk-based smoothie, or oat-milk.

4. A method of making a beverage of clause 1 comprising hydrating soluble oat flour comprising mixing the soluble oat flour with a liquid at a temperature of 4 to 30° C., wherein the amount of soluble oat flour in the liquid is 1 wt % to 10 wt % based on total weight of the liquid; and adding the hydrated soluble oat flour to beverage components to form the beverage.

5. A semi-solid dairy product comprising soluble oat flour in an amount of 2 to 11 wt % based on total weight of the semi-solid dairy product.

6. The semi-solid dairy product of clause 5 selected from the group consisting of dips, yogurt, ice-cream, and processed cheeses comprising hydrated soluble oat flour in an amount to provide ½ to 1 serving of whole grain per 4 oz. to 8 oz. serving of dairy product.

7. The semi-solid dairy product of clause 5 wherein the semi-solid dairy product is selected from the group consisting of yogurt, ice-cream, dips, and processed cheeses.

8. The semi-solid dairy product of clause 5 wherein the product is a reduced fat cream-based dip, wherein the dip contains 50% less fat compared to a full fat dip, and whereby the full fat dip and reduced fat cream-based dip have a viscosity of about 600,000 cp.

9. A method of making a semi-solid dairy product of clause 5 comprising hydrating soluble oat flour comprising mixing the soluble oat flour with a liquid at a temperature of 4 to 30° C., wherein the amount of soluble oat flour in the liquid is 2 wt % to 11 wt % based on total weight of the liquid; and adding the hydrated soluble oat flour to components to form the semi-solid dairy products.

10. An instant powder for preparing cold beverages comprising 25 to 60 wt % soluble oat flour wherein, when hydrated in liquid, the beverage provides ½ to 1 serving of whole grain per 8 oz. serving of the beverage.

11. The instant powder of clause 10 wherein the beverage is selected from the group consisting of fruit juice, vegetable juice, milk beverage, water, shakes, and smoothies.

12. An instant powder comprising 25 to 35 wt % soluble oat flour wherein, when hydrated in liquid, the powder provides ½ to 1 whole serving of whole grain per 4 to 8 oz. serving of product.

13. The instant powder of clause 12, wherein the instant powder further comprises components for preparing comestibles served hot and wherein, when hydrated in liquid, the comestible provides ½ to 1 whole serving of whole grain per 6 oz. serving of the comestible.

14. The instant powder of clause 13 wherein the comestibles are selected from the group consisting of hot chocolate, congee, gravy, sauce, and soup.

15. The instant powder of clause 12, wherein the instant powder further comprises components for preparing a semi-solid comestible product.

16. The instant powder of clause 15 wherein the semi-solid comestible product is selected from the group consisting of puddings, mousses, custards, and gelatins.

17. A bakery product selected from the group consisting of muffins, cookies, breads, bagels, pizza crust, cakes, crepes, and pancakes prepared from ingredients comprising soluble oat flour in an amount of 2 to 10 wt % as a texturizer.

18. The bakery product of clause 17 wherein the product is a cookie comprising about 15-35 wt % oat flour wherein the oat flour further comprises oat flakes, oat flour, and soluble oat flour.

19. The bakery product of clause 18 wherein oat flakes and oat flour comprise about 15-25 wt % of the cookie and soluble oat flour comprises about 2-5 wt % of the cookie.

20. The bakery product of clause 17 wherein the product is a muffin comprising about 20-30% wt % flour and wherein about 5-10% of the oat flour is soluble oat flour.

21. The bakery product of clause 17 wherein the soluble oat flour provides at least ½ serving of whole grains.

22. Instant oatmeal comprising oat flakes and a powder, wherein the powder comprises flavors, sweeteners, and at least one texturizer; wherein the at least one texturizer comprises 0.09 to 0.3 wt % soluble oat flour.

23. The instant oatmeal of clause 22 wherein the at least one texturizer consists of soluble oat flour and guar gum.

24. The instant oatmeal of clause 22 wherein the at least one texturizer consists of soluble oat flour.

25. A ready-to-eat soup comprising about 2 to 10 wt % of soluble oat flour based on total weight of the soup wherein the soluble oat flour provides at least ½ serving of whole grains per 8 oz. serving.

26. A frozen commodity selected from the group consisting of ice cream and slushies comprising soluble oat flour in an amount of 2 to 10 wt % based on total weight of the frozen commodity.

27. The frozen commodity of clause 26 wherein the frozen commodity is a slushie that exhibits antifoaming properties.

28. A method of producing a soluble oat or barley flour comprising:
combining a whole oat or barley flour starting mixture and a suitable enzyme to form an enzyme starting mixture;
heating the enzyme starting mixture to between about 120° F. and about 200° F. to begin to hydrolyze the starch molecules; and
extruding the resultant mixture to continue hydrolyzing the starch and further to gelatinize and cook the mixture to form the soluble oat or barley flour.

29. The method of clause 28 wherein the whole oat or barley flour starting mixture comprises whole oat or barley flour, granulated sugar, and at least one antioxidant.

30. The method of clause 29 wherein the whole oat or barley flour starting mixture further comprises a maltodextrin.

31. The method of clause 28 wherein the whole oat or barley flour starting mixture comprises about 50 to about 95% whole oat or barley flour, about 3 to about 15% granulated sugar, 0 to about 15% maltodextrin, and an effective amount of at least one antioxidant.

32. The method of clause 31 wherein the whole oat flour or barley starting mixture comprises about 80 to about 95% whole oat or barley flour.

33. The method of clause 31 wherein the whole oat flour or barley starting mixture comprises about 90 to about 95% whole oat or barley flour.

34. The method of clause 28 further comprising forming pelletized soluble oat or barley flour.

35. The method of clause 34 further comprising granulating the pelletized soluble oat or barley flour.

36. The method of clause 28 wherein the extruding occurs at a barrel temperature of about 140° F. to about 250° F.

37. The method of clause 28 wherein the extruding occurs at a dough temperature of about 212° F. to about 260° F.

38. The method of clause 28 wherein the enzyme starting mixture is heated to 140° F. to about 180° F.

39. A method for preparing a beverage containing a soluble oat or barley flour comprising:
combining a whole oat or barley flour starting mixture and a suitable enzyme to form an enzyme starting mixture;
heating the enzyme starting mixture to between about 120° F. and about 200° F. to begin to hydrolyze the starch molecules; and
extruding the resultant mixture to continue hydrolyzing the starch and further to gelatinize and cook the mixture to form the soluble oat or barley flour; and
adding the soluble oat or barley flour to a beverage.

40. The method of clause 39 wherein the beverage is selected from the group consisting of fruit juices, dairy beverages, and carbonated soft drinks.

41. The method of clause 40 wherein the soluble flour is added to provide a beverage having 1 to 25% soluble fiber based on total weight of the beverage.

42. A beverage prepared in accordance with the method of clause 39.

43. A method for preparing a food product containing a soluble oat or barley flour comprising:
combining a whole oat or barley flour starting mixture and a suitable enzyme to form an enzyme starting mixture;
heating the enzyme starting mixture to between about 120° F. and about 200° F. to begin to hydrolyze the starch molecules; and
extruding the resultant mixture to continue hydrolyzing the starch and further to gelatinize and cook the mixture to form the soluble oat or barley flour; and
adding the soluble oat or barley flour to a mixture for a food product.

44. The method of clause 43 wherein the food product is selected from the group consisting of bars, cereals, puddings, smoothies, ice cream, cookies, and crackers.

45. A composition comprising:
a whole grain;
wherein the whole grain comprises hydrolyzed starch.

46. The composition of clause 45, wherein the hydrolyzed starch is a gelatinized, hydrolyzed starch.

47. The composition of clause 45, further comprising:
    deactivated α-amylase enzyme.
48. The composition of clause 45, wherein the whole grain is extruded.
49. The composition of clause 45, wherein the whole grain is selected from the group consisting of whole oat and whole barley.
50. The composition of clause 45, wherein the whole grain comprises whole grain flour.
51. The composition of clause 45, wherein the whole grain is made from unhydrolyzed whole grain.
52. The composition of clause 45, wherein the whole grain is made from unprocessed whole grain.
53. The composition of clause 50, wherein the whole grain flour comprises hydrolyzed starch.
54. The composition of clause 50, wherein the hydrolyzed starch is a gelatinized, hydrolyzed starch.
55. The composition of clause 50, further comprising:
    deactivated amylase enzyme.
56. The composition of clause 50, wherein the whole grain flour is extruded.
57. The composition of clause 45, further comprising a liquid.
58. The composition of clause 57, wherein the liquid comprises a water-containing component.
59. The composition of clause 58, wherein the liquid comprises water.
60. The composition of clause 58, wherein the liquid comprises milk.
61. The composition of clause 60, wherein the liquid comprises a non-dairy milk.
62. The composition of clause 58, wherein the composition comprises about 70-95 wt % water.
63. The composition of clause 45, wherein the composition comprises about 1.5 wt % to about 10% water.
64. The composition of clause 45, wherein the composition is granulated to a Max 85% through a US 30 screen.

While this invention has been particularly shown and described with reference to preferred embodiments, it will be understood by those skilled in the art that various changes in form and detail can be made therein without departing from the spirit and scope of the invention. Accordingly, the invention can be embodied in other specific forms without departing from the spirit or essential characteristics thereof. The foregoing embodiments, therefore, are to be considered in all respects illustrative rather than limiting the invention described herein. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Scope of the invention is thus indicated by the appended claims, rather than by the foregoing description, and all changes that come within the meaning and range of equivalency of the claims are intended to be embraced therein.

What is claimed is:

1. A composition comprising:
    a whole grain;
    wherein the starch in the whole grain is hydrolyzed gelatinized starch;
    wherein the hydrolyzed gelatinized starch is enzymatically hydrolyzed; and
    wherein substantially only α-amylase is used to catalyze the enzymatic hydrolysis, and wherein the parameters used to conduct the enzymatic hydrolysis, including the use of substantially only α-amylase, are effective to maintain the whole grain status of the whole grain after the enzymatic hydrolysis.

2. The composition of claim 1, further comprising:
    deactivated α-amylase enzyme.
3. The composition of claim 1, wherein the whole grain is extruded.
4. The composition of claim 1, wherein the whole grain is selected from the group consisting of whole oat and whole barley.
5. The composition of claim 4, wherein the whole grain is whole oat.
6. The composition of claim 4, wherein the whole grain is whole barley.
7. The composition of claim 1, wherein the whole grain comprises whole grain flour.
8. The composition of claim 7, further comprising:
    deactivated α-amylase enzyme.
9. The composition of claim 7, wherein the whole grain flour is extruded.
10. The composition of claim 1, further comprising a liquid.
11. The composition of claim 10, wherein the liquid comprises a water-containing component.
12. The composition of claim 11, wherein the liquid comprises water.
13. The composition of claim 11, wherein the liquid comprises milk.
14. The composition of claim 13, wherein the liquid comprises a non-dairy milk.
15. The composition of claim 11, wherein the composition comprises 70-95 wt. % water.
16. The composition of claim 1, wherein the composition comprises 1.5 wt. % to 10 wt. % water.
17. The composition of claim 1, wherein the composition is granulated to a Max 85% through a US 30 screen.
18. The composition of claim 1, wherein the whole grain is formed by adding an enzyme to a starting complete whole grain material to hydrolyze the starch in the starting complete whole grain material.
19. The composition of claim 1, wherein the whole grain is only hydrolyzed to an extent that maintains the whole grain status of the whole grain comprising the hydrolyzed gelatinized starch.
20. The composition of claim 1, wherein the whole grain is a complete whole grain.
21. The composition of claim 1, wherein the composition comprises:
    50 to 95 wt. % whole grain;
    3 to 15 wt. % sugar;
    0.1 to 2 wt. % antioxidant; and
    0 to 15 wt. % maltodextrin.
22. The composition of claim 1, wherein the composition comprises:
    80 to 95 wt. % whole grain;
    3 to 15 wt. % sugar;
    0.1 to 2 wt. % antioxidant; and
    0 to 15 wt. % maltodextrin;
    wherein the weight percentages of the whole grain, the sugar, the antioxidant and the maltodextrin are calculated with 100 wt. % being equivalent to the weight of the whole grain, the sugar, the antioxidant and the maltodextrin.

23. The composition of claim 22, wherein the composition comprises:
90 to 95 wt. % whole grain; and
0 wt. % maltodextrin.

24. The composition of claim 1, wherein the composition comprises
80 to 95 wt. % whole grain;
3 to 7 wt. % sugar;
0.25 to 0.75 wt. % antioxidant;
3 to 7 wt. % maltodextrin;
wherein the weight percentages of the whole grain, the sugar, the antioxidant and the maltodextrin are calculated with 100 wt. % being equivalent to the weight of the whole grain, the sugar, the antioxidant and the maltodextrin.

* * * * *